United States Patent
Adachi et al.

(10) Patent No.: US 12,298,543 B2
(45) Date of Patent: May 13, 2025

(54) ELECTROMAGNETIC WAVE ABSORBING PARTICLE DISPERSION, ELECTROMAGNETIC WAVE ABSORBING LAMINATE, AND ELECTROMAGNETIC WAVE ABSORBING TRANSPARENT BASE MATERIAL

(71) Applicant: SUMITOMO METAL MINING CO., LTD., Tokyo (JP)

(72) Inventors: Kenji Adachi, Chiba (JP); Satoshi Yoshio, Ehime (JP); Masao Wakabayashi, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 549 days.

(21) Appl. No.: 17/759,651

(22) PCT Filed: Jan. 28, 2021

(86) PCT No.: PCT/JP2021/003100
§ 371 (c)(1),
(2) Date: Jul. 28, 2022

(87) PCT Pub. No.: WO2021/153693
PCT Pub. Date: Aug. 5, 2021

(65) Prior Publication Data
US 2023/0070110 A1 Mar. 9, 2023

(30) Foreign Application Priority Data
Jan. 31, 2020 (JP) .................. 2020-015746

(51) Int. Cl.
*G02B 5/22* (2006.01)
*C08K 3/22* (2006.01)
(Continued)

(52) U.S. Cl.
CPC ............... *G02B 5/206* (2013.01); *C08K 3/22* (2013.01); *C08K 9/02* (2013.01); *G02B 5/22* (2013.01); *C08K 2003/2258* (2013.01)

(58) Field of Classification Search
CPC ........................................ G02B 5/22
See application file for complete search history.

(56) References Cited

U.S. PATENT DOCUMENTS

2006/0178254 A1 8/2006 Takeda et al.
2015/0030802 A1 1/2015 Chen et al.
(Continued)

FOREIGN PATENT DOCUMENTS

CN 105016392 11/2015
CN 109761282 5/2019
(Continued)

OTHER PUBLICATIONS

Extended European Search Report mailed on Nov. 16, 2023 issued with respect to the corresponding European patent application No. 21747227.3.
(Continued)

*Primary Examiner* — Joseph P Martinez
(74) *Attorney, Agent, or Firm* — IPUSA, PLLC

(57) ABSTRACT

An electromagnetic wave absorbing particle dispersion includes electromagnetic wave absorbing particles containing cesium tungsten oxide represented by a general formula $Cs_xW_{1-y}O_{3-z}$ and having a crystal structure of an orthorhombic crystal structure or a hexagonal crystal structure, x, y, and z being $0.2 \leq x \leq 0.4$, $0 < y \leq 0.4$, and $0 < z \leq 0.46$; and a solid medium. The electromagnetic wave absorbing particles are dispersed in the solid medium.

15 Claims, 17 Drawing Sheets

(51) Int. Cl.
  *C08K 9/02* (2006.01)
  *G02B 5/20* (2006.01)

(56) References Cited

U.S. PATENT DOCUMENTS

| | | | |
|---|---|---|---|
| 2015/0153478 | A1 | 6/2015 | Takeda et al. |
| 2019/0077676 | A1 | 3/2019 | Nakayama et al. |
| 2019/0161361 | A1 | 5/2019 | Tsunematsu et al. |
| 2019/0225503 | A1 | 7/2019 | Okada et al. |
| 2020/0170150 | A1* | 5/2020 | Okada ............ C08L 101/12 |
| 2020/0198984 | A1 | 6/2020 | Okada et al. |
| 2021/0087070 | A1 | 3/2021 | Nakayama et al. |
| 2023/0052771 | A1 | 2/2023 | Adachi et al. |

FOREIGN PATENT DOCUMENTS

| | | |
|---|---|---|
| EP | 3431565 | 1/2019 |
| EP | 3757632 | 12/2020 |
| JP | H09-107815 | 4/1997 |
| JP | 2003-029314 | 1/2003 |
| JP | 2013-173642 | 9/2013 |
| JP | 2016-083903 | 5/2016 |
| JP | 2019-142762 | 8/2019 |
| JP | 6743226 | 8/2020 |
| KR | 10-2011-0136274 | 12/2011 |
| KR | 10-1182194 | 9/2012 |
| WO | 2005/037932 | 4/2005 |
| WO | 2017/159791 | 9/2017 |
| WO | 2017/161423 | 9/2017 |
| WO | 2019/031243 | 2/2019 |
| WO | 2019/031246 | 2/2019 |
| WO | 2019/155996 | 8/2019 |
| WO | 2021/153692 | 8/2021 |

OTHER PUBLICATIONS

Zeng Xianzhe et al.: "The preparation of a high performance near-infrared shielding Cs x WO 3 / SiO 2 composite resin coating and research on its optical stability under ultraviolet illumination", Journal of Materials Chemistry C, vol. 3, No. 31, Jan. 1, 2015 (Jan. 1, 2015), pp. 8050-8060, XP055774005, GB ISSN: 2050-7526, DOI: 10.1039/C5TC01411E, Retrieved from the Internet: URL: <https://pubs.rsc.org/en/content/articlepdf/2015/tc/c5tc01411e>.
Jing-Xiao Liu et al., "Materials Characterization", 2013, 84, pp. 182-187, fig. 1, table 1, Results and Discussion.
Qiming Zhong et al., "Thin Solid Films", 1991, 205, pp. 85-88, fig. 1-4, tables 1-2.
International Search Report mailed on Mar. 16, 2021 with respect to PCT/JP2020/048402.
Extended European Search Report mailed on May 23, 2023 with respect to the corresponding European patent application No. 20906352.8.
Kumagai N et al: "Thermodynamics and kinetics of electrochemical intercalation of Lithium into Li0.50WO3.25 with a hexagonal tungsten bronze structure", Solid State Ionics, col. 98, No. 3-4, 1997, pp. 159-166, XP004126142.
Wagata Hajime et al: "Fabrication of Combined One-Dimensional and Three-Dimensional Structure of Potassium Tungstate Crystal Layers by Spray Deposition with Polystyrene Colloidal Crystal Templates", Crystal Growth & Design, vol. 13, 2013, pp. 3294-3298, XP055945310.
S. Nakakura, A. F. Arif, K. Machida, K. Adachi, T. Ogi, "Cationic Defect Engineering for Controlling the Infrared Absorption of Hexagonal Cesium Tungsten Bronze Nanoparticles", Inorganic Chemistry, 58, 9101-9107 (2019).

International Search Report issued for related International Patent Application No. PCT/JP2021/037923 on Nov. 30, 2021.
International Search Report issued for related International Patent Application No. PCT/JP2021/003098 on Apr. 6, 2021.
Yamada, H. et al., "Lithium insertion to ReO3-type metastable phase in the Nb2O5-WO3 system", Solid State Ionics, 2001, 140, 249-255 entire text.
Yoshio, S. et al., "Cesium polytungstates with blue-tint-tunable near-infrared absorption", RSC Advances, Mar. 11, 2020, 10, 10491-10501. abstract, II Experimental, III Results and discussion.
Informal Comments filed on Aug. 27, 2021 in response to the Written Opinion of the International Searching Authority with respect to PCT/JP2021/003098.
Nakamura Keisuke et al: "Monolayered Nanodots of Transition Metal Oxides", Journal of the American Chemical Society, vol. 135, No. 11, Mar. 7, 2013 (Mar. 7, 2013), pp. 4501-4508, XP093059376, ISSN: 0002-7863, DOI: 10.1021/ja400443a, Retrieved from the Internet: URL: https://pubs.acs.org/doi/pdf/10.1021/ja400443a, *p. 4501-p. 4505; figures*.
Miyauchi Masahiro et al: "Tungstate nanosheet ink as a photonless and electroless chromic device", Journal of Materials Chemistry C, vol. 2, No. 19, Jan. 1, 2014 (Jan. 1, 2014), pp. 3732-3737, XP093059338, GB, ISSN: 2050-7526, DOI: 10.1039/C3TC32513J, Retrieved from the Internet: URL: https://pubs.rsc.org/en/content/articlepdf/2014/tc/c3tc32513j> *p. 3732-p. 3736; figures*.
Da Silva K. Pereira et al: "Vibrational properties of Cs 4 W 11 O 35 and Rb 4 W 11 O 35 systems: high pressure and polarized Raman spectra: Vibrational properties of Cs 4 W 11 O 35 and Rb 4 W 11 O 35 systems", Journal of Raman Spectroscopy, vol. 42, No. 3, Mar. 1, 2011 (Mar. 1, 2011), pp. 474-481, XP093059362, GB, ISSN: 0377-0486, DOI: 10.1002/jrs.2737, Retrieved from the Internet: URL: https://api.wiley.com/onlinelibrary/tdm/v1/articles/10.1002%2Fjrs.2737> *p. 474-p. 481; figures*.
Pereira Da Silva K. et al: "Temperature-dependent Raman scattering study on Cs4W11O35 and Rb4W11O35 systems", Journal of Solid State Chemistry, vol. 199, Mar. 1, 2013 (Mar. 1, 2013), pp. 7-14, XP093059369, US, ISSN: 0022-4596, DOI: 10.1016/j.jssc.2012.09.021, Retrieved from the Internet: URL: https://pdf.sciencedirectassets.com/272605/1-s2.0-S0022459612X0015X/1-s2.0-S0022459612006160/main.pdf?X-Amz-Security-Token =IQoJb3JpZ21uX2VjECYaCXVzLWVhc3QtMSJHMEUCIQD8sEUrJFePiCjJXZuM88qE4MAdLg JkSvyWXEQQO.
K. Adachi and T. Asahi, "Activation of plasmons and polarons in solar control cesium tungsten bronze and reduced tungsten oxide nanoparticles," Journal of Material Research, vol. 27, 965-970 (Mar. 28, 2012).
S. Yoshio and K. Adachi, "Polarons in reduced cesium tungsten bronzes studied using the DFT + U method," Materials Research Express, vol. 6, 026548, 1-14 (2019).
K. Machida, M. Okada, and K. Adachi, "Excitations of free and localized electrons at nearby energies in reduced cesium tungsten bronze nanocrystals," Journal of Applied Physics, vol. 125, 103103 (Mar. 12, 2019).
S. F. Solodovnikov, N.V. Ivannikova, Z.A. Solodovnikova, E.S. Zolotova, "Synthesis and X-ray diffraction study of potassium, rubidium, and cesium polytungstates with defect pyrochlore and hexagonal tungsten bronze structures," Inorganic Materials, vol. 34, No. 8, 845-853 (1998).
M. Okada, K. Ono, S. Yoshio, H. Fukuyama and K. Adachi, "Oxygen vacancies and pseudo Jahn-Teller destabilization in cesium-doped hexagonal tungsten bronzes," Journal of American Ceramic Society, vol. 102, 5386-5400 (2019).
S. Yoshio, M. Okada, K. Adachi, "Destabilization of Pseudo Jahn-Teller Distortion in Cesium-doped hexagonal tungsten bronzes", J. Appl. Phys., vol. 124, 063109-1-8 (Aug. 14, 2018).
International Search Report mailed on Apr. 20, 2021 with respect to PCT/JP2021/003100.

* cited by examiner

ELECTROMAGNETIC WAVE ABSORBING PARTICLE DISPERSION, ELECTROMAGNETIC WAVE ABSORBING LAMINATE, AND ELECTROMAGNETIC WAVE ABSORBING TRANSPARENT BASE MATERIAL

TECHNICAL FIELD

The present invention relates to an electromagnetic wave absorbing particle dispersion, an electromagnetic wave absorbing laminate, and an electromagnetic wave absorbing transparent base material.

BACKGROUND ART

According to the Physics and Chemistry Dictionary, 5th edition, "an electromagnetic wave with a wavelength in a range of from about 1 nm to 1 mm is referred to as light". This range of wavelengths includes the visible light region and the infrared ray region.

Near-infrared rays contained in sunlight penetrate a room through a window material, or the like, enter the room, raise a temperature of a wall and a floor of the room, and increase a temperature of the room. Conventionally, a light shielding member for the window material or the like to block near-infrared rays entering through the window has been used to suppress an increase in the temperature in the room in order to make a thermal environment in the room comfortable.

As the light shielding member used for the window material or the like, Patent Document 1 proposes a light shielding film containing a black fine powder including an inorganic pigment such as carbon black or titanium black, an organic pigment such as aniline black, or the like.

In addition, Patent Document 2 discloses a heat insulating sheet in which strip-shaped films having infrared reflectivity and strip-shaped films having infrared absorption are woven as warm yarns or weft yarns, respectively. Patent Document 2 also describes that for the strip-shaped film having infrared reflectivity, a laminate of synthetic resin films which are subjected to an aluminum deposition process is used.

The applicant of the present application proposed, in Patent Document 3, an infrared-shielding material fine particle dispersion, in which infrared material fine particles are dispersed in a medium, the infrared material fine particles containing tungsten oxide fine particles or/and composite tungsten oxide fine particles, and a dispersed particle diameter of the infrared material fine particles being 1 nm or more and 800 nm or less.

CITATION LIST

Patent Literature

Patent Document 1: Japanese Unexamined Patent Application Publication No. 2003-029314
Patent Document 2: Japanese Unexamined Patent Application Publication No. 9-107815
Patent Document 3: WO 2005/037932

Non-Patent Literature

Non-Patent Document 1: K. Adachi and T. Asahi, "Activation of plasmons and polarons in solar control cesium tungsten bronze and reduced tungsten oxide nanoparticles," Journal of Material Research, Vol. 27, 965-970 (2012)

Non-Patent Document 2: S. Yoshio and K. Adachi, "Polarons in reduced cesium tungsten bronzes studied using the DFT+U method," Materials Research Express, Vol. 6, 026548 (2019)

Non-Patent Document 3: K. Machida, M. Okada, and K. Adachi, "Excitations of free and localized electrons at nearby energies in reduced cesium tungsten bronze nanocrystals," Journal of Applied Physics, Vol. 125, 103103 (2019)

Non-Patent Document 4: S. F. Solodovnikov, N. V. Ivannikova, Z. A. Solodovnikova, E. S. Zolotova, "Synthesis and X-ray diffraction study of potassium, rubidium, and cesium polytungstates with defect pyrochlore and hexagonal tungsten bronze structures," Inorganic Materials, Vol. 34, 845-853 (1998)

Non-Patent Document 5: M. Okada, K. Ono, S. Yoshio, H. Fukuyama and K. Adachi, "Oxygen vacancies and pseudo Jahn-Teller destabilization in cesium-doped hexagonal tungsten bronzes," Journal of American Ceramic Society, Vol. 102, 5386-5400 (2019)

Non-Patent Document 6: S. Yoshio, M. Okada, K. Adachi, "Destabilization of Pseudo Jahn-Teller Distortion in Cesium-doped Hexagonal Tungsten Bronzes", J. Appl. Phys., vol. 124, 063109-1-8 (2018)

SUMMARY OF INVENTION

Problem to be Solved by the Invention

Above-described Patent Document 3 discloses tungsten oxide fine particles or/and composite tungsten oxide fine particles as infrared-shielding material fine particles. A transmission film in which the tungsten oxide is dispersed has a blue color, and the degree of blue becomes stronger as the added amount increases.

However, in recent years, for applications such as glass for vehicles or light-to-heat conversion materials, for example, there is a need for a neutral color in which there is no color such as blue, in the transmission color while increasing the absorption rate for near infrared, that is, decreasing the solar radiation transmittance.

Based on a blue material such as the transmission film, in which the tungsten oxide is dispersed, the hue obtained when adjusting the color of glass with various pigments or dyes is limited. Transmission color of yellow, which is a complementary color, is particularly difficult.

Further, in an application of a light-to-heat conversion material, specifically, for example, for adhesion of a transparent resin member by light-to-heat conversion, a pure white color is required. However, it is difficult to develop a pure white color in a material such as the tungsten oxide.

On the other hand, for example, for a transmission film in which the composite tungsten oxide is dispersed, if the transmission color is set to neutral, that is, a transparent color tone, the application can be expanded. However, composite tungsten oxides that can achieve a neutral color while reducing solar radiation transmittance, as dispersions, have not been reported.

Accordingly, according to one aspect of the present invention, it is an object to provide an electromagnetic wave absorbing particle dispersion with a transmission color having a more neutral color tone while suppressing solar radiation transmittance.

Means for Solving Problems

According to an aspect of the present invention, an electromagnetic wave absorbing particle dispersion includes electromagnetic wave absorbing particles containing cesium tungsten oxide represented by a general formula $Cs_xW_{1-y}O_{3-z}$ and having a crystal structure of an orthorhombic crystal structure or a hexagonal crystal structure, x, y, and z being $0.2 \leq x \leq 0.4$, $0 < y \leq 0.4$, and $0 < z \leq 0.46$; and a solid medium, the electromagnetic wave absorbing particles being dispersed in the solid medium.

Effects of the Invention

According to one aspect of the present invention, an electromagnetic wave absorbing particle dispersion with a transmission color having more neutral color tone while suppressing a solar radiation transmittance can be provided.

MODE FOR CARRYING OUT THE INVENTION

Figure 1A:
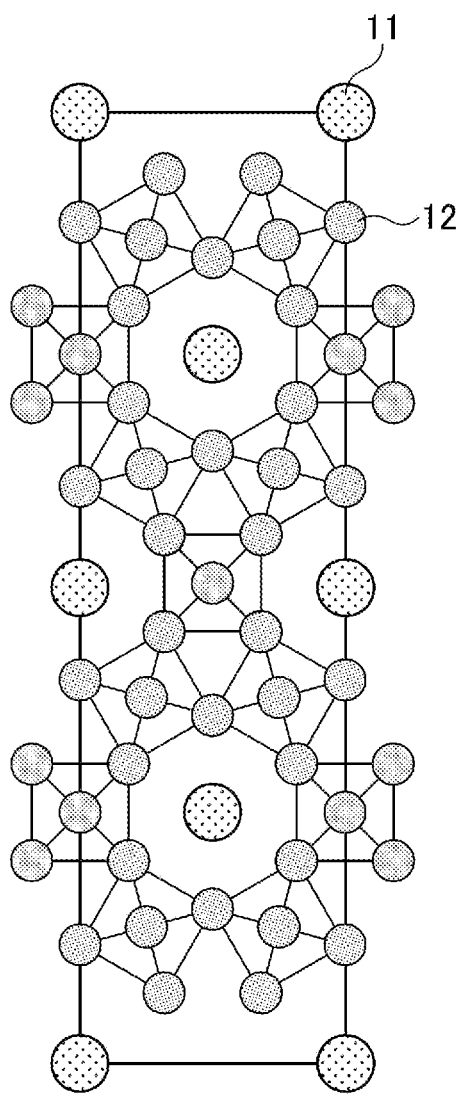
FIG. 1A is an explanatory view of a crystal structure of cesium tungsten oxide ($Cs_4W_{11}O_{35}$).
Figure 1A:
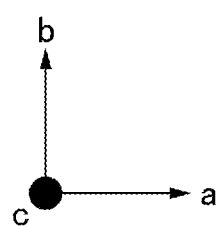

Embodiments of the present invention will be described with reference to drawings. However, the invention is not limited to the following embodiments, and various modifications and substitutions can be made to the following embodiments without departing from the scope of the invention.

[Electromagnetic Wave Absorbing Particles and Method for Producing Electromagnetic Wave Absorbing Particles]

Before describing an electromagnetic wave absorbing particle dispersion according to the present embodiment, electromagnetic wave absorbing particles that can be suitably used in the electromagnetic wave absorbing particle dispersion according to the present embodiment, and a method for producing the electromagnetic wave absorbing particles will be described.

(1) Electromagnetic Wave Absorbing Particles

The transmission color of cesium-doped hexagonal tungsten bronze nanoparticles that have been conventionally used as electromagnetic wave absorbing particles is specified by an imaginary part of a dielectric function ($\varepsilon_2$) (the experimentally obtained $\varepsilon_2$ is described in Non-Patent Document 1) and a band structure (Non-Patent Document 2).

In the energy region of visible light (1.6 eV to 3.3 eV), the band gap of cesium-doped hexagonal tungsten bronze (hereinafter, shortened to Cs-HTB) is sufficiently large. In addition, according to Fermi's golden rule a transition of electron between d-orbits in tungsten is prohibited, which reduces the probability of electronic transition, and the value of $\varepsilon_2$ is small. The $\varepsilon_2$ represents absorption of photons by electrons, so that when $\varepsilon_2$ is small at the visible light wavelength, visible light transmittance occurs. However, in the vicinity of the blue wavelength which is the shortest wavelength in the visible light region, the absorption by interband transition exists, and in the vicinity of the red wavelength which is the longest wavelength, the localized surface plasmon resonance (LSPR) absorption and the polaronic electronic transition absorption exist (Non-Patent Document 3). For this reason, light transmittances are restricted, respectively.

As described above, in Cs-HTB, the band gap is sufficiently large that the interband transition exceeds the energy of light with the blue wavelength, and thus the transmittance of blue light is high. Conversely, on the red-wavelength side, the number of conducting electrons in Cs-HTB is large, so that the LSPR absorption and the polaronic absorption are stronger, and at the same time, since the absorption wavelength becomes closer to the red-wavelength side, the transmittance is low. Therefore, the transmission color of the Cs-HTB nanoparticle dispersion film appears blue.

That is, in order to neutralize the bluish transmission color of the Cs-HTB, absorption on the blue side may be enhanced and transmission on the red side may be enhanced. For this purpose, it is preferable to shift the absorption position of the interband transition to the low energy side, and weaken the LSPR absorption and the polaronic absorption to shift to the low energy side.

To attenuate the LSPR absorption and the polaronic absorption, it is effective to reduce the amounts of free electrons and localized electrons contained in the material.

The above-described increase in absorption on the blue side is accomplished by using a material having a different energy band structure with a band gap at low energy as a basis. The transmission on the red side can be controlled by adjusting the amount of cesium ions ($Cs^+$) and vacancies of oxygen ($V_O$), which are sources of free electrons and localized electrons.

Based on the above discussion, the inventors of the present invention studied various cesium tungsten oxides, which were oxides containing cesium (Cs) and tungsten (W), and as a result, found that when electromagnetic wave absorbing particles containing cesium tungsten oxide obtained by reducing a crystal powder of a cesium tungsten oxide precursor $nCs_2O \cdot mWO_3$, n and m being integers and a ratio m/n being $3.6 \varepsilon m/n \leq 9.0$, containing Cs and W were used, the bluish color tone of the transmission film, which is an electromagnetic wave absorbing particle dispersion, also decreased thereby neutralizing the color tone.

It is considered that the above electromagnetic wave absorbing particles were obtained by starting from a compound with a smaller band gap than hexagonal Cs-HTB and a lower transmittance of blue, and gradually increasing $V_O$ by reducing the compound, to gradually increase the LSPR absorption and the polaronic absorption within an acceptable range to optimize the transmittance of red, so that the color tone was neutralized.

In the above-described cesium tungsten oxide precursor $nCs_2O \cdot mWO_3$, which contains Cs, electric charges of Cs and W, which are positive elements, are neutralized by 0 and are non-conductive. In compounds aligned with the $WO_3$—$Cs_2O$ line such as $Cs_2W_7O_{22}$, $Cs_6W_{20}O_{63}$, $Cs_2W_6O_{19}$, $Cs_4W_{11}O_{35}$, $Cs_6W_{11}O_{36}$, and $Cs_2W_3O_{10}$, valences are balanced, so that the Fermi energy $E_F$ exists between the valence band and the conduction band, and are non-conductive. When the Cs/W ratio (molar ratio) is 0.2 or more, in order to incorporate Cs with a large ion radius, a basic structure formed by a W—O octahedron is either a hexagonally symmetrical structure with a large hexagonal gap; or a crystal structure in which an atomic arrangement of a hexagonal crystal structure with a large hexagonal gap or a cubic crystal (pyrochlore structure) contains a planar defect containing W loss (tungsten loss) and the symmetry falls down to an orthorhombic crystal structure or a monoclinic crystal structure.

For example, in the model of Solodovnikov1998 (Non-Patent Document 4), into a hexagonal array of W—O octahedron similar to hexagonal tungsten bronze, a plane in which W and O are lost at b/8 pitch in an orthorhombic crystal structure unit cell in the hexagonal crystal structure (110) plane (=the orthorhombic crystal structure (010) plane) is inserted, $2Cs_2O \cdot_{11}WO_3$ is, as a whole, an orthorhombic crystal structure. In the above-described cesium tungsten oxide precursors $nCs_2O \cdot mWO_3$, n and m being integers and a ratio m/n being $3.6 \leq m/n \leq 9.0$, the band gap is narrower than Cs-HTB and thus the transmittance of blue is low. However, it was found that by heating and reducing the precursor, the entire structure gradually changes to a hexagonal structure of tungsten bronze, and during the process, the band structure changes and the band gap is widened and the absorption of blue is weakened, thereby increasing the transmission of blue. In addition, as the reduction proceeds, electrons are gradually injected into the conduction band to form a conductor, and the band gap is gradually widened according to the Burstein-Moss effect, and the transmission of blue becomes even stronger.

When the orthorhombic crystal structure becomes the hexagonal crystal structure by the heating reduction, planar defects, including W loss in the orthorhombic crystal structure, gradually disappears to form the hexagonal structure of the W—O octahedra. Planar defects including W loss are present on the $(010)_{ORTH}$ plane, but this plane is inherited by the hexagonal prism plane $\{100\}_{HEX}$, i.e., $[(100)_{HEX}, (010)_{HEX}, (110)_{HEX}]$, so that with heating reduction, the hexagonal crystal structure is gradually formed with defects on the $\{100\}_{HEX}$ plane. The hexagonal crystal structure at this stage is deviated from the perfect hexagonal symmetry because a defect is contained in the $\{100\}_{HEX}$ plane, and may be referred to as a pseudo-hexagonal crystal structure. Thus, with the heating reduction, the crystal structure changes from an orthorhombic crystal structure to a pseudo-hexagonal crystal structure, and further to a hexagonal crystal structure. At this time, the planar defect on the $(010)_{ORTH}$ plane including W loss contained in the orthorhombic crystal structure is considered to be inherited by the planar defect on the $\{100\}_{HEX}$ plane defect, gradually decrease and finally disappear.

With the change in the crystal structure during the heating reduction, the electronic structure also changes. The disappearance of the W loss results in a large amount of electron implantation in the material. In an orthorhombic crystal structure, outer-shell electrons of Cs are used to neutralize O, providing charge neutralization as a whole. However, when W loss is reduced and the crystal changes to a pseudo-hexagonal crystal structure, six outer-shell electrons per one atom of W are used to neutralize O, and outer-shell electrons of Cs enter the W-5d orbit in a lower part of the conduction band, to form free electrons. The free electrons provide near infrared absorption by the LSPR absorption. The heating reduction, on the other hand, simultaneously has an effect of generating $V_O$. Generation of $V_O$ proceeds at random sites. When $V_O$ is generated, W atoms adjacent to $V_O$ become electron excess states, and localized electrons bound to $W^{5+}$ are generated (Non-Patent Document 2). This localized electron transits to a vacant level in the upper part of the conduction band, resulting in the polaronic absorption. However, some of the localized electrons are excited to free electron orbits to provide the LSPR absorption (Non-Patent Document 3). Peak wavelengths of the absorptions by the above-described free electrons and localized electrons are both near-infrared, so that tails of the absorptions cover the red wavelength, and thus the transmittance of red is reduced. The greater the amount of the free electrons and the localized electrons, i.e., the greater the degree of reduction, the more the reduction of the transmittance of red, because the LSPR absorption wavelength and the polaronic absorption wavelength shift to higher wavelengths and the greater the amount of the absorption.

Therefore, the bluish transmission color can be neutralized by reducing the crystalline powder of the cesium tungsten oxide precursor $nCs_2O \cdot mWO_3$, n and m being integers and a ratio m/n being $3.6 \leq m/n \leq 9.0$, and adjusting the degree of the reduction.

Electromagnetic wave absorbing particles that can be suitably used for the electromagnetic wave absorbing particle dispersion in the embodiment of the present application described as above can be prepared by heating a crystalline powder of the cesium tungsten oxide precursor $nCs_2O \cdot mWO_3$ containing Cs and W in a reducing atmosphere at a temperature of 650° C. to 950° C. inclusive. Preferably, n and m in the formula of cesium tungsten oxide are integers and a ratio m/n satisfies a relation $3.6 \leq m/n \leq 9.0$.

Namely, particles obtained by heating and reducing a crystalline powder of the cesium tungsten oxide precursor $nCs_2O \cdot mWO_3$, n and m being integers and a ratio m/n being $3.6 \leq m/n \leq 9.0$, containing cesium and tungsten in an atmosphere of a reducing gas at a temperature of 650° C. to 950° C. inclusive can be used as the electromagnetic wave absorbing particles.

In order to change a whole or a part of the precursor to hexagonal tungsten bronze by the heating reduction, the above-described value of the ratio m/n is required to be within the range of $3.6 \leq m/n \leq 9.0$ as described above. If the ratio is less than 3.6, after the heating reduction, the precursor becomes a cubic pyrochlore phase, which is intensely colored and does not absorb near-infrared ray. When the ratio is greater than 9.0, after the heating reduction, the precursor is subjected to a phase separation into a hexagonal tungsten bronze and tungsten trioxide, and the near infrared absorption effect is significantly reduced. More preferably, the cesium tungsten oxide precursor is $Cs_4W_{11}O_{35}$, where m/n=5.5. That is, more preferably, particles obtained by heating and reducing a cesium tungsten oxide precursor containing the $Cs_4W_{11}O_{35}$ phase as the main phase at a temperature of 650° C. to 950° C. inclusive in an atmosphere of a reducing gas can be used as the electromagnetic wave absorbing particles. By using the electromagnetic wave absorbing particles obtained by the high temperature reduction of $Cs_4W_{11}O_{35}$ as a dispersion of electromagnetic wave absorbing particle dispersion, a significant near infrared absorption effect can be obtained while suppressing the bluish transmission color. Here, the main phase means a phase that is contained the most in the mass ratio.

As described above, the heating temperature when reducing the cesium tungsten oxide is preferably 650° C. to 950° C. inclusive. By setting the temperature to 650° C. or higher, the structural change from the orthorhombic crystal structure to the hexagonal crystal structure can be sufficient progressed, and the near infrared absorption effect can be enhanced. In addition, by setting the temperature to 950° C. or lower, the speed of the crystal structure change can be maintained appropriately, and an appropriate crystal state and an electronic state can be easily controlled. Incidentally, if the heating temperature is higher than 950° C. and the reduction becomes excessive, a lower oxide such as W metal or $WO_2$ may be formed, and this also undesirable from such viewpoint.

The electromagnetic wave absorbing particles suitably used for the electromagnetic wave absorbing particle dispersion according to the present embodiment can contain cesium tungsten oxide expressed by the general formula $Cs_xW_{1-y}O_{3-z}$ ($0.2 \leq x \leq 0.4$, $0 < y \leq 0.4$, $0 < z \leq 0.46$), and having an orthorhombic crystal structure or a hexagonal crystal structure.

When the cesium tungsten oxide contained in the electromagnetic wave absorbing particles satisfies the above-described general formula, the degree of the W loss and the degree of the vacancy of oxygen $V_O$ are within appropriate ranges, and in the case of using the particles as the electromagnetic wave absorbing particles dispersion, an electromagnetic wave absorbing particle dispersion having a transmission color with a more neutral color tone while suppressing the solar radiation transmittance can be prepared.

The electromagnetic wave absorbing particles may be formed of the above-described composite tungsten oxide. However, also in this case, unavoidable impurities entering in the production process are not excluded.

The conventionally known tungsten bronze for absorbing electromagnetic wave has a hexagonal structure. On the other hand, the composite tungsten oxide contained in the electromagnetic wave absorbing particles used as the electromagnetic wave absorbing particle dispersion according to the present embodiment can have an orthorhombic crystal structure or a hexagonal crystal structure. Here, the hexagonal crystal structure includes a pseudo-hexagonal crystal structure.

The composite tungsten oxide contained in the electromagnetic wave absorbing particles preferably has a linear defect or a planar defect on one or more planes selected from the (010) plane of the orthorhombic crystal structure, the {100} plane that is a prism plane of the hexagonal crystal structure, and the (001) plane that is a bottom plane of the hexagonal crystal structure. The above-described defect includes an irregular stack based on misalignment between planes, a disorder of an alignment of Cs and W atoms in plane, and atomic positions, which often result in streaks in electron beam diffraction spots. The {100} plane, which is a prism plane of the hexagonal crystal structure, means the (100)-plane, the (010)-plane, and the (110)-plane. The defect of the composite tungsten oxide, i.e., a lattice defect, is associated with at least W loss, specifically partial loss of W, which results in an absence of electron in the crystal, and is one of the essential causes of the neutralization of the blue tone, as described above.

The cesium tungsten oxide has a defect, and such defect can include tungsten loss as described above.

Also, a part of O of the W—O octahedron constituting the orthorhombic crystal structure or the hexagonal crystal structure which is the basic structure of the cesium tungsten oxide can be further randomly lost. Vacancies $V_O$ of oxygen of the octahedron are randomly introduced as described above, and it is known that in the known hexagonal tungsten bronze $Cs_{0.32}WO_{3-y}$, the vacancies reach y=0.46 or up to 15% of the total lattice points of O at maximum (Non-Patent Document 5). The cesium tungsten oxide can include $V_O$ of amount of z=0.46 at maximum in the general formula $Cs_xW_{1-y}O_{3-z}$ expressing a cesium tungsten oxide contained in the electromagnetic wave absorbing particles used for the electromagnetic wave absorbing particle dispersion according to the present embodiment. That is, z can be less than or equal to 0.46.

The lattice constant of the cesium tungsten complex oxide corresponds to an amount of defect in the crystal lattice, or composition, and crystallinity. Although for values in the a-axis variations are observed for these variables, values in the c-axis correspond to an amount of lattice defects or optical characteristic relatively well. As a result, the c-axis length in terms of a hexagonal crystal structure of the cesium tungsten oxide contained in the electromagnetic wave absorbing particle used for the electromagnetic wave absorbing particle dispersion in the present embodiment is preferably 7.560 Å to 7.750 Å inclusive. By setting the c-axis length in terms of a hexagonal crystal structure of the cesium tungsten oxide to within the above-described range, the near infrared absorption effect is sufficient improved, and the visible light transmittance is particularly enhanced. Incidentally, when the cesium tungsten oxide is a hexagonal crystal structure, conversion is not necessary, and the c-axis length of the hexagonal crystal structure becomes the c-axis length in terms of a hexagonal crystal structure.

The cesium tungsten oxide contained in the electromagnetic wave absorbing particles used in the electromagnetic wave absorbing particle dispersion in the present embodiment is often identified as a mixed phase of an orthorhombic crystal structure and a hexagonal crystal structure when a diffraction pattern of a sample is measured by the X-ray powder diffraction method. For example, when the raw material of $Cs_4W_{11}O_{35}$ is reduced, the material is identified as a mixture of the orthorhombic crystal structure $Cs_4W_{11}O_{35}$ and the hexagonal crystal structure $Cs_{0.32}WO_3$. In this case, the lattice constants of the respective phases can be determined by Rietveld analysis or the like, and these constants can be converted into values in terms of a hexagonal crystal structure. Since the orthorhombic crystal structure is a hexagonal crystal structure with a lattice defect plane, as previously described, the lattice constant of the orthorhombic crystal structure can be converted into a lattice constant of a hexagonal crystal structure by an appropriate lattice-compatible model. Assuming the correspondence of the changes in the lattice between the orthorhombic crystal structure and the hexagonal crystal structure is the model Solodovnikov 1998 (Non-Patent Document 4), the relationship of $4a_{orth}^2 + b_{orth}^2 = 64a_{hex}^2 = 64b_{hex}^2$ and $c_{orth} = c_{hex}$ can be extracted from the geometric relationship for this model, so that all the lattice constants in terms of a hexagonal crystal structure can be obtained using these equations. In the above equations, $a_{orth}$, $b_{orth}$, and $c_{orth}$ refer to lengths in the a-axis, the b-axis, and the c-axis of the orthorhombic crystal structure, respectively, and $a_{hex}$, $b_{hex}$, and $c_{hex}$ refer to lengths of the hexagonal crystal structure in the a-axis, the b-axis, and the c-axes, respectively.

In the cesium tungsten oxide contained in the electromagnetic wave absorbing particles used in the electromagnetic wave absorbing particle dispersion according to the present embodiment, a part of Cs may be replaced by an additive element. In this case, the additive element is preferably one or more types selected from Na, Tl, In, Li, Be, Mg, Ca, Sr, Ba, Al, and Ga.

The above-described additive elements have electron donation properties, and assist in electron donation to the conduction band of the W—O octahedral backbone at the Cs site.

The average particle diameter of the electromagnetic wave absorbing particles according to the present embodiment is not particularly limited, but the average particle diameter is preferably 0.1 nm to 200 nm inclusive. This is because the average particle diameter of the electromagnetic wave absorbing particles is set to 200 nm or less, and the localized surface plasmon resonance is more remarkably expressed, so that the near infrared absorption characteristics can be particularly enhanced, that is, the solar radiation transmittance can be particularly suppressed. In addition, since the average particle diameter of the electromagnetic wave absorbing particles is set to 0.1 nm or more, the particles can be easily manufactured industrially. The particle diameter is closely related to the color of the dispersion transmission film, i.e., the electromagnetic wave absorbing particle dispersion. Within the particle diameter range where the Mie scattering dominates, the smaller the particle diameter, the less the scattering of short wavelengths in the visible light region. Therefore, when the particle diameter is increased, the blue color tone is suppressed. However, when the average particle diameter exceeds 100 nm, the haze of the film due to light scattering is not negligible. When the average particle diameter exceeds 200 nm, in addition to the increase in the haze of the film, the generation of surface plasmon is suppressed, and the LSPR absorption is excessively reduced.

Here, the average particle diameter of the electromagnetic wave absorbing particles can be obtained from the median diameter of the plurality of electromagnetic wave absorbing particles measured from the transmission type electron microscope image, or from the dispersed particle diameter measured by a particle diameter measurement apparatus based on the dynamic light scattering method for the dispersion liquid.

It is preferable to take into consideration the reduction of scattering caused by the electromagnetic wave absorbing particles, particularly when applied to an application where transparency within the visible light region such as, for example, a windshield of an automobile is important. When such scattering reduction is important, the average particle diameter of the electromagnetic wave absorbing particles is particularly preferably 30 nm or less.

The average particle diameter refers to a particle diameter at the cumulative value of 50% in the particle diameter distribution, and the average particle diameter has the same meaning elsewhere in the specification of the present application. As a method for measuring the particle diameter distribution to calculate the average particle diameter, direct measurement of particle diameter for each particle can be used, for example, using a transmission electron microscope. The average particle diameter can also be measured by a particle diameter measurement apparatus based on the dynamic light scattering method for the dispersion liquid, as described above.

The electromagnetic wave absorbing particles may be subjected to a surface treatment for the purpose of surface protection, improvement of durability, prevention of oxidation, improvement of water resistance, and the like. Although the specific content of the surface treatment is not particularly limited, for example, the electromagnetic wave absorbing particles of the present embodiment can be modified on the surface with a compound including elements of one or more types selected from Si, Ti, Zr, and Al. In this case, a compound containing elements of one or more types (elements) selected from Si, Ti, Zr, and Al includes one or more types selected from an oxide, a nitride, a carbide, and the like.

Here, the band structures of the cesium tungsten oxide and the cesium tungsten oxide precursor will be described.

As described above, it was shown that when $nCs_2O \cdot mWO_3$, n and m being integers and a ratio m/n being $3.6 \le m/n \le 9.0$, was reduced at high temperature, a solar radiation shielding material having more neutral transmission color was obtained. During the high-temperature reduction, electrons are injected into the conduction band by the hexagonal crystallization including the disappearance of the W defect, and the generation of $V_O$, which is considered to be a source of near infrared absorption expression. This change in electronic structure is supported by the first principle calculation.

Figure 1B:
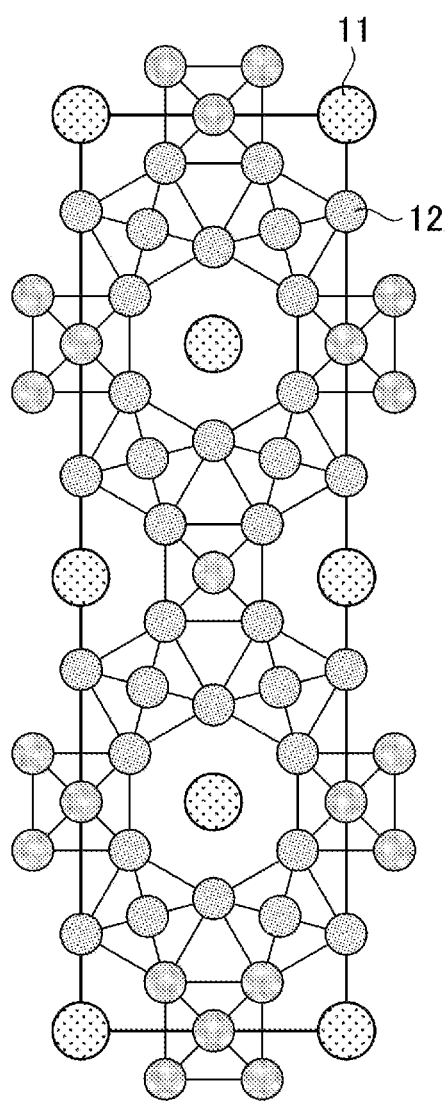
FIG. 1B is an explanatory view of a crystal structure of cesium tungsten oxide ($Cs_4W_{12}O_{36}$).
Figure 1B:
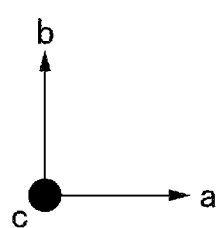

FIG. 1A shows a crystal structure of $Cs_4W_{11}O_{35}$. FIG. 1B shows the crystal structure of $Cs_4W_{12}O_{36}$, which is $Cs_{0.33}WO_3$. In FIGS. 1A and 1B, cesium 11 and oxygen 12 are shown. Elements of the same type have the same hatching. Tungsten is not shown in FIGS. 1A and 1B because tungsten is disposed in the octahedron formed with oxygen 12. FIG. 1B shows a structure in which the axis of $Cs_{0.33}WO_3$ is re-aligned with an orthorhombic crystal structure so that it can be compared with $Cs_4W_{11}O_{35}$ in FIG. 1A.

The structure of $Cs_4W_{11}O_{35}$ in FIG. 1A is a crystal structure of $Cs_4W_{12}O_{36}$ in FIG. 1B, in which W and O are regularly lost.

Figure 2A:
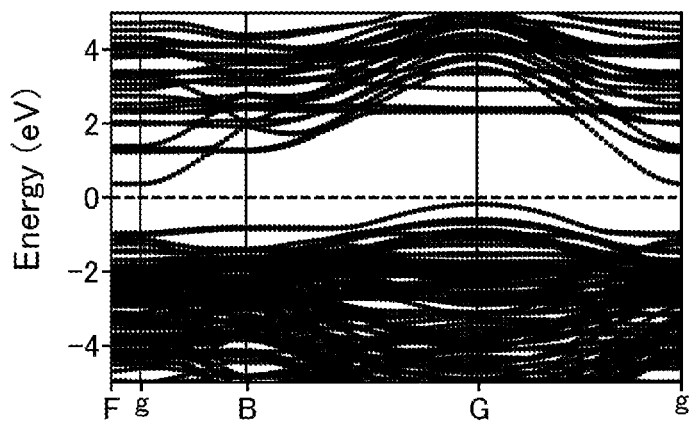
FIG. 2A is an energy band structure of cesium tungsten oxide ($Cs_4W_{11}O_{35}$).
Figure 2B:
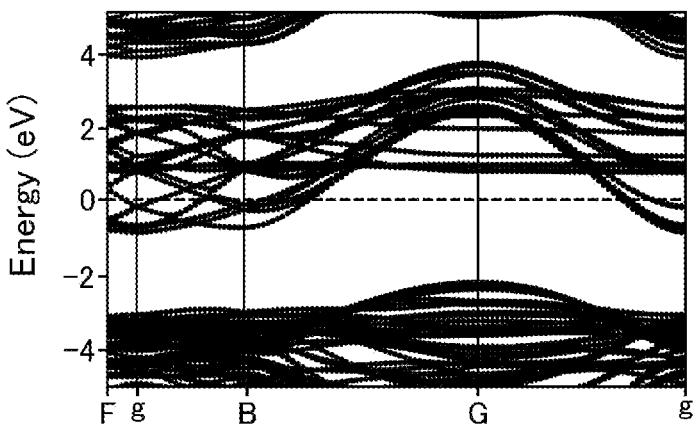
FIG. 2B is an energy band structure of cesium tungsten oxide ($Cs_4W_{12}O_{36}$).

The band structures of the crystal structures of the cesium tungsten oxides of FIGS. 1A and 1B are shown in FIGS. 2A and 2B, respectively. In addition, the band structure of $Cs_4W_{11}O_{36}$, in which W is lost by one with respect to $Cs_4W_{12}O_{36}$ in FIG. 1B as a reference, and the band structure of $Cs_6W_{17}O_{54}$, in which extending the cell by 1.5 times in the b-axis direction and W is lost by one are shown in FIGS. 2C and 2D, respectively.

The band structure of $Cs_4W_{11}O_{35}$ shown in FIG. 2A and the band structure of $Cs_4W_{12}O_{36}$ shown in FIG. 2B are similar, but the position of the Fermi energy ($E_F$) is within the band gap in FIG. 2A and the position of the Fermi energy ($E_F$) is in the lower part of the conduction band in FIG. 2B. Thus, $Cs_4W_{11}O_{35}$ is an insulator and $Cs_4W_{12}O_{36}$ is a conductor. In the case of $Cs_4W_{11}O_{35}$, with respect to $Cs_4W_{12}O_{36}$ as a reference, W and O are less by one for each unit cell. In $Cs_4W_{12}O_{36}$, which is filled with W and O, a hexagonal crystal structure $WO_3$ network is formed, and it is interpreted that Cs electrons are injected into the W-5d orbit to become a conductor (Non-Patent Document 6).

Figure 2C:
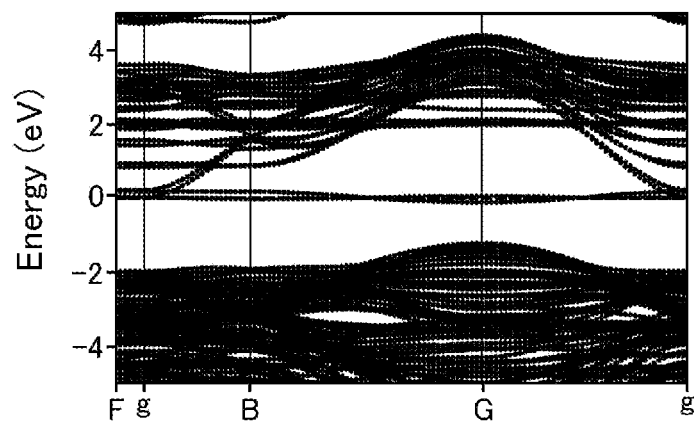
FIG. 2C is an energy band structure of cesium tungsten oxide ($Cs_4W_{11}O_{36}$).

FIG. 2C shows $Cs_4W_{11}O_{36}$ having a structure in which W is subtracted by one from $Cs_4W_{12}O_{36}$ in FIG. 2B.

Figure 2D:
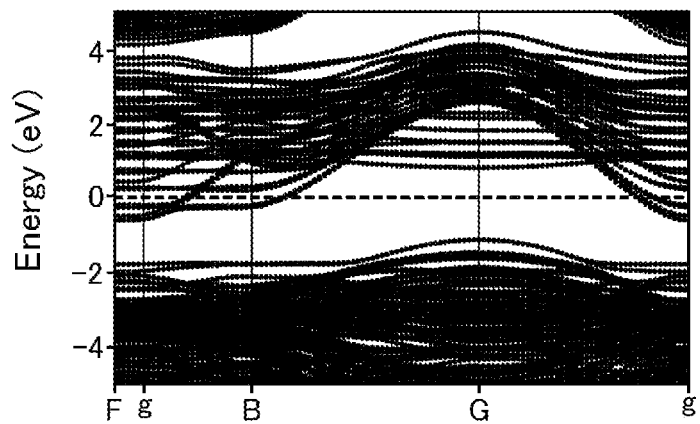
FIG. 2D is an energy band structure of cesium tungsten oxide ($Cs_6W_{17}O_{54}$).

FIG. 2D shows $Cs_6W_{17}O_{54}$, that is, $3Cs_2O \cdot 17WO_3$, having a structure in which W is subtracted by one while maintaining the charge neutrality in view of $Cs_4W_{12}O_{36}$, that is, $Cs_6W_{18}O_{54}$ in FIG. 2B.

The amount of W loss decreases in the order of FIGS. 2A, 2D, and 2B, but $E_F$ is gradually increasing toward the bottom of the conduction band, which supports that the W electrons are injected into the W-5d orbit and the conductive electrons increase and the near infrared absorption becomes greater.

A detailed calculation example has already been reported in which O is lost from $Cs_4W_{12}O_{36}$, and free electrons and localized electrons significantly increase with the introduction of a localized orbit to the bottom of the conduction band (Non-Patent Document 2).

An experimentally obtained pseudo-hexagonal crystal structure (intermediate structures in the middle of phase transition between an orthorhombic crystal structure and a hexagonal crystal structure) is considered to be an electronic state, in which the above-described elements are mixed. Thus, with the reduction, hexagonal crystallization including the disappearance of W loss and the $V_O$ formation, electrons are injected gradually into the conduction band, and the Fermi energy $E_F$ rises from the band gap to the lower part of the conduction band.

Figure 3A:
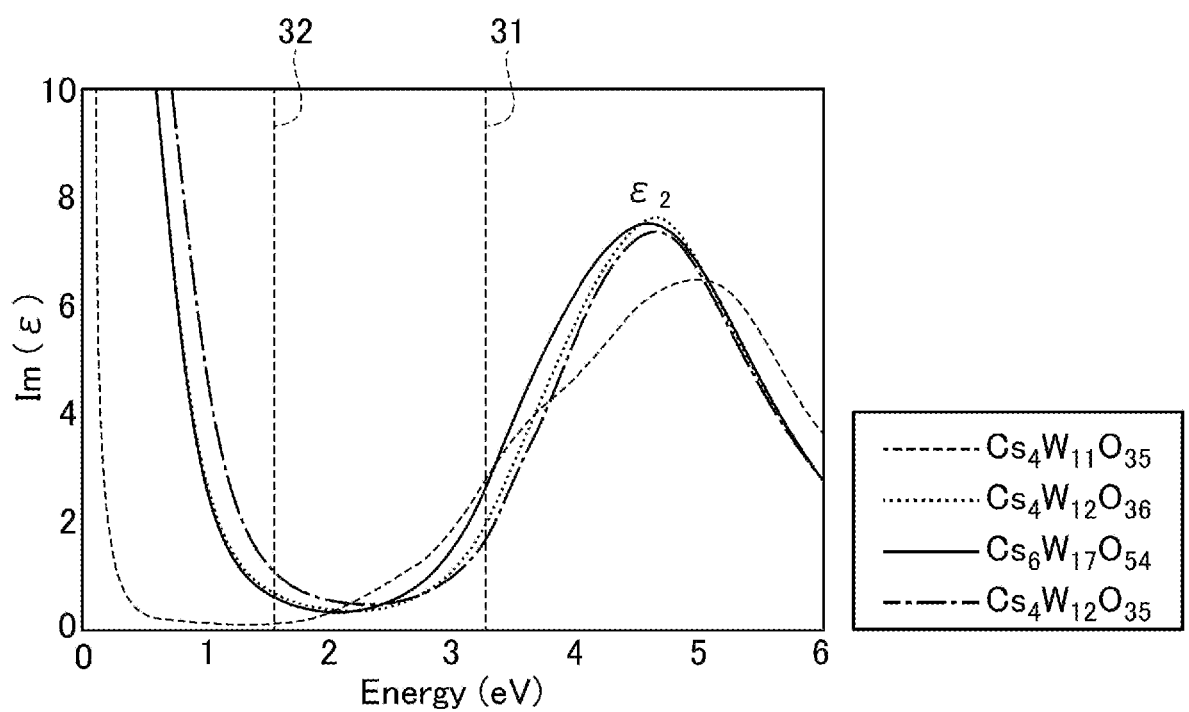
FIG. 3A is a dielectric function of cesium tungsten oxide.
Figure 3B:
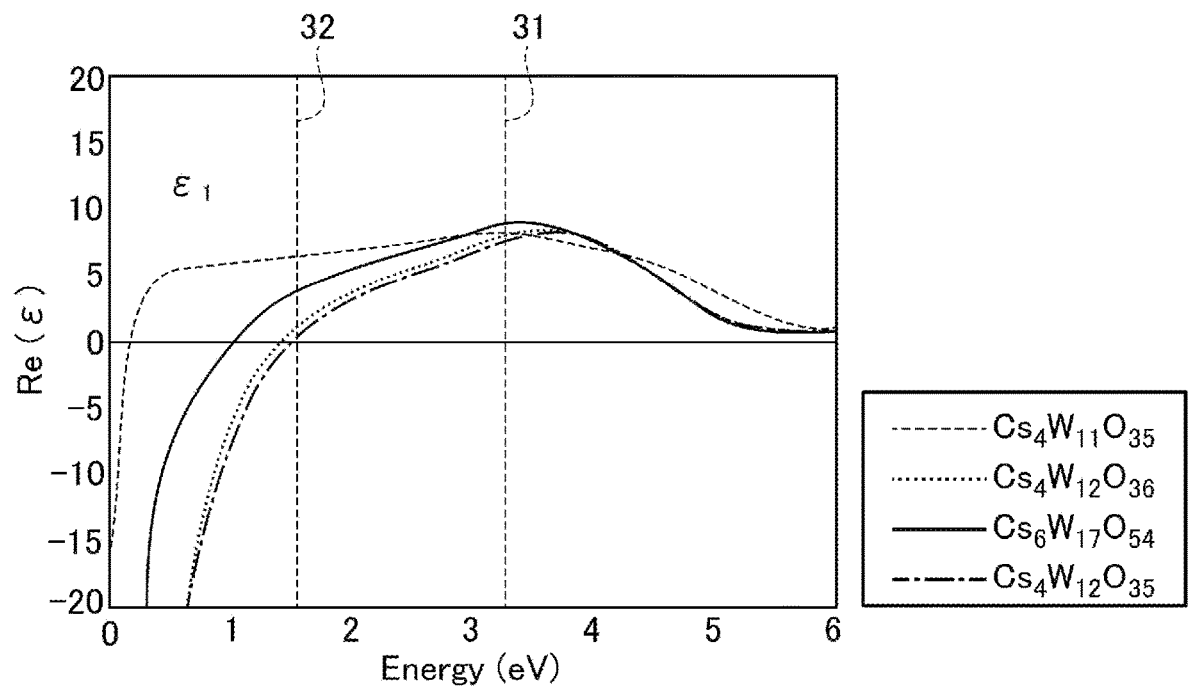
FIG. 3B is a dielectric function of cesium tungsten oxide.

The results of calculation for a dielectric function including a Drude term based on these band structures are shown in FIGS. 3A and 3B. Focusing on the position of $\varepsilon_1=0$ of the dielectric function $\varepsilon_1$ shown in FIG. 3B, it can be seen that the screened plasma frequency ($\Omega_{SP}$) increases in the order of $Cs_4W_{11}O_{35}$, $Cs_6W_{17}O_{54}$, $Cs_4W_{12}O_{36}$, and $Cs_4W_{12}O_{35}$. In this order, near infrared absorption is expected to increase, and this tendency is consistent with results of observations.

From a plot of the dielectric function $\varepsilon_2$ shown in FIG. 3A, $\varepsilon_2$ in the visible region for cesium tungsten oxides is found to be generally small. At an energy of 3.3 eV in the blue region indicated by a dashed line 31, specified by the interband transition, the absorptions of $Cs_4W_{11}O_{35}$ and $Cs_6W_{17}O_{54}$, which have narrow band gaps, become large. On the other hand, at 1.6 eV in the red region indicated by a dotted line 32, the absorption of $Cs_4W_{12}O_{35}$ is large, which is influenced by the tail of the surface plasmon absorption. Transmission light in the red region is expected to decrease in the order that the frequency $\Omega_{SP}$ decreases. The profile of $\varepsilon_2$ in the visible light region shown in FIG. 3A corresponds essentially to an experimental observation shown in FIG. 9B and reproduces the tendency in FIG. 9B well. In other words, as to the reason why the bluish color tone decreases in the cesium tungsten oxide contained in the electromagnetic wave absorbing particles that can be suitably used, compared to the conventionally used cesium tungsten oxide, in the electromagnetic wave absorbing particle dispersion in accordance with the present embodiment, is thought that $Cs_{0.33}W_{1-y}O_{3-z}$ phase containing W loss is formed by using $nCs_2O \cdot mWO_3$, n and m being integers and a ratio m/n being $3.6 \leq m/n \leq 9.0$, with loss of W and O as the raw material, thereby increasing the absorption on the high energy side. By adjusting the high temperature reduction of $nCs_2O \cdot mWO_3$, n and m being integers and a ratio m/n being $3.6 \leq m/n \leq 9.0$, the band gap and the amount of electrons injected into the conduction band are adjusted, and the bluish color tone can be adjusted. In addition, it was confirmed that the near infrared absorption effect was maintained at a relatively high level in this process.

(Method for Manufacturing Electromagnetic Wave Absorbing Particles)

The method for manufacturing the electromagnetic wave absorbing particles described above is not particularly limited, and a method can be used without being particularly limited, provided that the method is capable of manufacturing the electromagnetic wave absorbing particles that satisfy the characteristics described above. In the following, an example of a configuration of the method for manufacturing electromagnetic wave absorbing particles will be described.

The method for manufacturing electromagnetic wave absorbing particles may include, for example, the following processes.

The method includes a cesium tungsten oxide precursor synthesis process for synthesizing a cesium tungsten oxide precursor, which is a tungstate salt containing cesium; and a heating reduction process for heating and reducing the cesium tungsten oxide precursor at a temperature of 650° C. to 950° C. inclusive in an atmosphere of a reducing gas.

Each process will be described below:

(1) Cesium Tungsten Oxide Precursor Synthesis Process

In the cesium tungsten oxide precursor synthesis process, a cesium tungsten oxide precursor, which is a tungstate salt containing cesium, i.e., a cesium tungstate salt, can be synthesized. If the cesium tungsten oxide precursor has already been synthesized, the method for manufacturing the electromagnetic wave absorbing particles in accordance with the present embodiment may begin with the heating reduction process.

The cesium tungsten oxide precursor, which is a cesium tungstate salt, is preferably a crystalline powder of $nCs_2O \cdot mWO_3$, n and m being integers and a ratio m/n being $3.6 \leq m/n \leq 9.0$. The cesium tungsten oxide precursor, which is cesium tungstate salt, is more preferably a stable cesium tungstate salt. The stable cesium tungstate salt includes one or more selected from $Cs_4W_{11}O_{35}$, $Cs_2W_6O_{19}$, $Cs_6W_{20}O_{63}$, $Cs_2W_7O_{22}$, $Cs_6W_{11}O_{36}$, and the like. The cesium tungsten oxide precursor is even more preferably a cesium tungsten oxide precursor that includes a $Cs_4W_{11}O_{35}$ phase as the main phase.

These cesium tungstate salts can be prepared, for example, by baking a powder mixture of raw materials containing cesium and tungsten at a temperature of 700° C. to 1000° C. inclusive in the atmosphere. The method for manufacturing cesium tungstate salt is not limited to the above-described form, and other methods such as a sol-gel method or a complex polymerization method can also be used.

For the cesium tungstate salt used as the starting material, a non-equilibrium tungstate salt obtained by vapor phase synthesis or the like may be used. The non-equilibrium tungstate salt includes powders by a thermal plasma method, powders by electron beam dissolution, and the like.

(2) Heating Reduction Process

The above-described cesium tungsten oxide precursor as the starting material, which is specifically a cesium tungstate salt having one or more types of crystal structure selected from, for example, an orthorhombic crystal structure, a monoclinic crystal structure, and a pseudo-hexagonal crystal structure, may be subjected to the heating reduction process.

In the heating reduction process, the cesium tungsten oxide precursor described above can be heated and reduced at the temperature of 650° C. to 950° C. inclusive in an atmosphere of a reducing gas. By performing the heating reduction process, electromagnetic wave absorbing particles containing cesium tungsten oxide having a desired composition can be obtained.

When the heating reduction process is performed, the process is preferably performed under an air flow of a reducing gas. As the reducing gas, a mixture of a reducing gas such as hydrogen, and one or more types of inert gas selected from nitrogen, argon, and the like may be used. In addition, a mild heating such as heating in a water vapor atmosphere or a vacuum atmosphere, and the reduction condition may be used in combination.

The method for manufacturing electromagnetic wave absorbing particles according to the present embodiment is not particularly limited to the above-described form. A variety of methods can be used for the method for manufacturing electromagnetic wave absorbing particles, capable of causing to have predetermined structures including a defect microstructure. The methods for manufacturing electromagnetic wave absorbing particles include a method for performing a reduction process for a tungstate salt obtained by a solid phase method, a liquid phase method, or a gas phase method, a method for reducing $WO_3$ in a molten alkali halide, and the like.

The method for manufacturing electromagnetic wave absorbing particles may further include an optional process.

(3) Pulverization Process

As noted above, the electromagnetic wave absorbing particles are preferably micronized into fine particles. Therefore, the method for manufacturing electromagnetic wave absorbing particles may include a pulverization process for pulverizing the powder obtained in the heating reduction process.

The specific means for pulverizing and micronizing the powder is not particularly limited, and various means capable of mechanically pulverizing the powder can be used. As the mechanical pulverization method, a dry pulverization method using a jet mill or the like can be used. In addition, in the process of obtaining the dispersion liquid of electromagnetic wave absorbing particles to be described later, the powder may be mechanically pulverized in a solvent.

(4) Modification Process

As noted above, the electromagnetic wave absorbing particles may be modified with a compound containing one or more types of elements selected from Si, Ti, Zr, and Al on the surfaces. Thus, the method for manufacturing electromagnetic wave absorbing particles may further include a modification process for, for example, modifying the electromagnetic wave absorbing particles with a compound containing one or more types of elements selected from Si, Ti, Zr, and Al.

In the modification process, a specific condition for modifying the electromagnetic wave absorbing particles is not particularly limited. For example, the method for manufacturing electromagnetic wave absorbing particles may include a modification process for adding an alkoxide or the like containing one or more types of elements selected from the above-described group of elements (group of metals) to the electromagnetic wave absorbing particles to be modified, and forming coatings on the surfaces of the electromagnetic wave absorbing particles.

[Electromagnetic Wave Absorbing Particle Dispersion Liquid]

Next, an example of a configuration of the electromagnetic wave absorbing particle dispersion liquid according to the present embodiment will be described.

The electromagnetic wave absorbing particle dispersion liquid in accordance with the present embodiment may include the electromagnetic wave absorbing particles described above; and one or more types of liquid media selected from water, an organic solvent, a fat and oil, a liquid resin, and a liquid plasticizer. The electromagnetic wave absorbing particle dispersion liquid preferably has a configuration in which the electromagnetic wave absorbing particles are dispersed in a liquid medium.

As the liquid medium, as described above, one or more types selected from water, an organic solvent, a fat and oil, a liquid resin, and a liquid plasticizer may be used.

As the organic solvent, a variety of organic solvents can be selected including alcoholic solvents, ketone solvents, hydrocarbon solvents, glycols, water solvents, and the like. Specifically, the organic solvents include one or more types selected from alcoholic solvents such as isopropyl alcohol, methanol, ethanol, 1-propanol, isopropanol, butanol, pentanol, benzyl alcohol, diacetone alcohol, and 1-methoxy-2-propanol; ketone solvents such as dimethyl ketone, acetone, methylethylketone, methylpropylketone, methylisobutylketone, cyclohexanone, and isophorone; ester solvents such as 3-methyl-methoxy-propionate, and butyl acetate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, and propylene glycol ethyl ether acetate; amides such as formamide, N-methylformamide dimethylformamide, dimethylacetamide, and N-methyl-2-pyrolidone; aromatic hydrocarbons such as toluene and xylene; halogenated hydrocarbons such as ethylene chloride and chlorobenzene; and the like.

Among them, however, the organic solvent having a low polarity is preferable, and particularly isopropyl alcohol, ethanol, 1-methoxy-2-propanol, dimethyl ketone, methyl ethyl ketone, methyl isobutyl ketone, toluene, propylene glycol monomethyl ether acetate, n-butyl acetate, and the like are more preferable. One or more types of these organic solvents may be used in combination.

As the fat and oil, for example, one or more types selected from drying oils such as linseed oil, sunflower oil, and tung oil; semi-drying oils such as sesame oil, cottonseed oil, rapeseed oil, and rice bran oil; non-drying oils such as olive oil, coconut oil, palm oil, and dehydrated castor oil; fatty acid monoesters obtained by performing direct ester reaction of monoalcohol with fatty acids of vegetable oils; ethers; petroleum-based solvents such as Isopar (registered trademark) E, Exxsol (registered trademark) Hexane, Heptane, E, D30, D40, D60, D80, D95, D110, and D130 (manufactured by Exxon Mobil Corporation), may be used.

As the liquid resin, for example, one or more types selected from a liquid acrylic resin, a liquid epoxy resin, a liquid polyester resin, a liquid urethane resin, and the like, may be used.

As the liquid plasticizer, for example, a liquid plasticizer for plastic may be used.

The components contained in the electromagnetic wave absorbing particle dispersion liquid are not limited to the above-described electromagnetic wave absorbing particles and the liquid media. The electromagnetic wave absorbing particle dispersion liquid may be further added an optional component, and may contain the optional component as necessary.

For example, the pH of the electromagnetic wave absorbing particle dispersion liquid may be adjusted by adding acid or alkali as necessary to the dispersion liquid.

In addition, in order to further improve the dispersion stability of the electromagnetic wave absorbing particles in the above-described electromagnetic wave absorbing particle dispersion liquid, and avoid coarsening of dispersed particle diameter due to re-agglomeration, various surfactants, coupling agents, or the like may be added to the electromagnetic wave absorbing particle dispersion liquid as dispersants.

The dispersant such as the surfactant or the coupling agent, can be selected according to the application, but the dispersant preferably has one or more types of functional groups selected from a group containing amine, a hydroxyl group, a carboxyl group, and an epoxy group. These functional groups adsorb to the surfaces of the electromagnetic wave absorbing particles to prevent agglomeration and have an effect of uniformly dispersing the electromagnetic wave absorbing particles also in the infrared shielding film deposited using the electromagnetic wave absorbing particles. A polymer-based dispersant having one or more types selected from the above-described functional groups (group of functional groups) in a molecule is further desirable.

Commercially available dispersants, which may be suitably used, include one or more types selected from Solsperse (registered trademark) 9000, 12000, 17000, 20000, 21000, 24000, 26000, 27000, 28000, 32000, 35100, 54000, and 250 (manufactured by Luvrizol Japan Limited), EFKA (registered trademark) 4008, 4009, 4010, 4015, 4046, 4047, 4060, 4080, 7462, 4020, 4050, 4055, 4400, 4401, 4402, 4403, 4300, 4320, 4330, 4340, 6220, 6225, 6700, 6780, 6782, and 8503 (manufactured by EFKA Additives B.V.), AJISPER (registered trademark) PA111, PB821, PB822, PN411 and FAMEX L-12 (manufactured by Ajinomoto Fine-Techno Co., Inc.), and DisperBYK (registered trademark) 101, 102, 106, 108, 111, 116, 130, 140, 142, 145, 161, 162, 163, 164, 166, 167, 168, 170, 171, 174, 180, 182, 192, 193, 2000, 2001, 2020, 2025, 2050, 2070, 2155, 2164, 220S, 300, 306, 320, 322, 325, 330, 340, 350, 377, 378, 380N, 410, 425, and 430 (manufactured by BYK JAPAN KK), DISPARLON (registered trademark) 1751N, 1831, 1850, 1860, 1934, DA-400N, DA-703-50, DA-725, DA-705, DA-7301, DN-900, NS-5210, and NVI-8514L (manufactured by Kusumoto Chemicals, Ltd.), ARUFON (registered trademark) UC-3000, UF-5022, UG-4010, UG-4035, and UG-4070 (manufactured by TOAGOSEI Co., Ltd.), and the like.

The dispersion processing method for the electromagnetic wave absorbing particles in the liquid medium is not particularly limited, provided that the electromagnetic wave absorbing particles can be dispersed in the liquid medium. On performing the processing, the electromagnetic wave absorbing particles are preferably dispersed so that an average particle diameter of the electromagnetic wave absorbing particles is 200 nm or less, and more preferably dispersed so that the average particle diameter is 0.1 nm or more and 200 nm or less.

A dispersion processing method for the electromagnetic wave absorbing particles in the liquid medium includes, for example, a dispersion processing method using an apparatus such as a bead mill, a ball mill, a sand mill, a paint shaker, or an ultrasonic homogenizer. Among them, a medium agitation mill such as a bead mill, a ball mill, a sand mill, or a paint shaker using media (beads, balls, or Ottawa sands) is preferable, from the viewpoint of reducing the time required for obtaining the desired average particle diameter, by pulverizing and dispersing the particles. By the pulverization-dispersion processing using the medium agitation mill, the electromagnetic wave absorbing particles are dispersed in the liquid medium, and at the same time, fine granulation proceeds according to collisions between the electromagnetic wave absorbing particles or collisions of the media with the electromagnetic wave absorbing particles, and the electromagnetic wave absorbing particles can be further subjected to the fine granulation and dispersed. That is, the pulverization-dispersion processing is performed.

As described above, the average particle diameter of the electromagnetic wave absorbing particles is preferably 0.1 nm or more and 200 nm or less. This is because, when the average particle diameter is small, the light scattering in the visible light region with the wavelength of from 400 nm to 780 nm by the geometric scattering or the Mie scattering is reduced, and as a result, it is possible to avoid a case where the electromagnetic wave absorbing particle dispersion, in which the electromagnetic wave absorbing particles are dispersed in a resin or the like, obtained by using the electromagnetic wave absorbing particle dispersion liquid in the present embodiment, for example, becomes cloudy glass, and a clear transparency is lost. That is, when the average particle diameter is 200 nm or less, the above-described geometric scattering mode and the Mie scattering mode become weaker in the light scattering, and the Rayleigh scattering mode becomes dominant. In the Rayleigh scattering region, the light scattered is proportional to the sixth power of the dispersed particle diameter, so that the scattering decreases as the dispersed particle diameter decreases, and the transparency improves. When the average particle diameter is 100 nm or less, the scattered light is very small and this is preferable.

Incidentally, the dispersion state of the electromagnetic wave absorbing particles in the electromagnetic wave absorbing particles dispersion, in which the electromagnetic wave absorbing particles are dispersed in a solid medium such as a resin, obtained by using the electromagnetic wave absorbing particle dispersion liquid according to the present embodiment, is not more agglomerated than the average particle diameter of the electromagnetic wave absorbing particles of the dispersion liquid, as long as a publicly known method for adding a dispersion liquid to a solid medium is performed.

In addition, when the average particle diameter of the electromagnetic wave absorbing particles is 0.1 nm to 200 nm inclusive, it is possible to avoid a case where the electromagnetic wave absorbing particle dispersion or a molding thereof (plate, sheet, or the like) that is manufactured becomes a grayish product with a monotonically decreasing transmittance.

The content of the electromagnetic wave absorbing particles in the electromagnetic wave absorbing particle dispersion liquid in accordance with the present embodiment is not particularly limited. However, for example, the content of the electromagnetic wave absorbing particles is preferably 0.01 wt % to 80 wt % inclusive. This is because a sufficient solar radiation transmittance can be achieved by setting the content of the electromagnetic wave absorbing particles to 0.01 wt % or more. In addition, the electromagnetic wave absorbing particles can be uniformly dispersed in the dispersion medium by setting the content to 80 wt % or less.

[Electromagnetic Wave Absorbing Particle Dispersion]

Next, an example of a configuration of the electromagnetic wave absorbing particle dispersion according to the present embodiment will be described.

The electromagnetic wave absorbing particle dispersion according to the present embodiment includes the electromagnetic wave absorbing particles described above and a solid medium. In the electromagnetic wave absorbing particle dispersion in the present embodiment, the electromagnetic wave absorbing particles are preferably dispersed in the solid medium.

The above-described electromagnetic wave absorbing particles are electromagnetic wave absorbing particles expressed by the general formula $Cs_xW_{1-y}O_{3-z}$ ($0.2 \leq x \leq 0.4$, $0 < y \leq 0.4$, $0 < z \leq 0.46$) and contain a cesium tungsten oxide having an orthorhombic crystal structure or hexagonal crystal structure. Because the details thereof have already been described, the description will be omitted in the following.

Hereinafter, the electromagnetic wave absorbing particle dispersion according to the present embodiment will be described in the following order: (1) solid medium, (2) manufacturing method, (3) additive agent, and (4) application example.

(1) Solid Medium

The solid medium may include a medium resin such as a thermoplastic resin, a thermosetting resin, or an ultraviolet curing resin. That is, a resin may be suitably used as the solid medium.

The specific material of the medium resin is not particularly limited, but is preferably one type of resin selected from, for example, the resin group consisting of polyester resin, polycarbonate resin, acrylic resin, styrene resin, polyamide resin, polyethylene resin, vinyl chloride resin, olefin resin, epoxy resin, polyimide resin, fluorine resin, ethylene-vinyl acetate copolymer, polyvinyl acetal resin, and ultraviolet curing resin; or a mixture of two or more types of resins selected from the resin group. As the polyester resin, polyethylene terephthalate resin may be suitably used.

The medium resins may also include a polymer dispersant having, as a functional group, one or more types of groups selected from a group containing amine in the main skeleton, a hydroxyl group, a carboxyl group, and an epoxy group.

The solid media are not limited to medium resins, and binders using metal alkoxides can also be used as the solid media. An alkoxide of Si, Ti, Al, Zr, or the like is representative of the metal alkoxide. An electromagnetic wave absorbing particle dispersion in which the solid medium contains an oxide can be prepared by hydrolyzing and condensation polymerizing the binder using these metal alkoxides by heating or the like.

The content ratio of the electromagnetic wave absorbing particles in the electromagnetic wave absorbing particle dispersion in accordance with the present embodiment is not particularly limited, but the electromagnetic wave absorbing particle dispersion preferably contains the electromagnetic wave absorbing particles in the ratio of from 0.001 wt % to 80 wt % inclusive.

The shape of the electromagnetic wave absorbing particle dispersion in the present embodiment is not particularly limited, but the electromagnetic wave absorbing particle dispersion in the present embodiment preferably has a sheet shape, a board shape, or a film shape. This is because the electromagnetic wave absorbing particle dispersion can be applied to a variety of uses by having a sheet shape, a board shape, or a film shape.

(2) Method for Manufacturing the Electromagnetic Wave Absorbing Particle Dispersion A method for manufacturing the electromagnetic wave absorbing particle dispersion in accordance with the present embodiment will be described below. Here, only an example of a configuration of the method for manufacturing the electromagnetic wave absorbing particle dispersion will be described, and the above-described method for manufacturing the electromagnetic wave absorbing particle dispersion is not limited to the following example of the configuration.

The electromagnetic wave absorbing particle dispersions in the present embodiment can be manufactured using, for example, a master batch. In this case, the method for manufacturing the electromagnetic wave absorbing particle dispersion in the present embodiment may include, for example, a master batch production process, as follows.

The master batch production process for obtaining a master batch, in which the electromagnetic wave absorbing particles are dispersed in a solid medium, will be described.

According to the master batch production process, a master batch, in which the electromagnetic wave absorbing particles are dispersed in the solid medium, can be produced.

The specific method for producing the master batch is not particularly limited. For example, the master batch can be produced by dispersing the electromagnetic wave absorbing particle dispersion liquid or the electromagnetic wave absorbing particles in a solid medium and pelletizing the solid medium.

An electromagnetic wave absorbing particle dispersion powder, obtained by removing a liquid medium from the electromagnetic wave absorbing particle dispersion liquid, may be used as the electromagnetic wave absorbing particles.

For example, a mixture is prepared by uniformly mixing the electromagnetic wave absorbent particle dispersion liquid, the electromagnetic wave absorbent particles, or the electromagnetic wave absorbent particle dispersion powder; particulates or pellets of the solid medium; and other additive agents, if necessary. Then, the master batches can be produced by processing the mixture to a form of pellet using a method of kneading the mixture in a vent type monoaxially or biaxially extruder and cutting a strand that is melt and extruded. In this case, the shape of the pellet includes a cylindrical shape or a prismatic shape. When producing the pellet, a method of directly cutting the melt-extruded strand, so-called hot cut method, may also be employed. In this case, the pellet generally has a shape close to a sphere.

In the master batch production process, when the electromagnetic wave absorbing particle dispersion liquid is used as a raw material, it is preferable to reduce and remove a liquid medium derived from the electromagnetic wave absorbing particle dispersion liquid. In this case, the degree of removing the liquid medium contained in the electromagnetic wave absorbing particle dispersion liquid is not particularly limited. For example, it is preferable to remove the liquid medium from the electromagnetic wave absorbent particle dispersion liquid or the like up to the amount allowable to remain in the master batch. When a liquid plasticizer is used as the liquid medium, the entire amount of the liquid plasticizer may remain in the electromagnetic wave absorbing particle dispersion.

The method for reducing or removing the liquid medium contained in the electromagnetic wave absorbing particle dispersion liquid from the electromagnetic wave absorbing particle dispersion liquid or a mixture of the electromagnetic wave absorbing particle dispersion liquid and a solid medium is not particularly limited. For example, the electromagnetic wave absorbing particle dispersion liquid is preferably dried under reduced pressure. Specifically, the electromagnetic wave absorbing particle dispersion liquid is dried under reduced pressure while stirring to separate the composition containing the electromagnetic wave absorbing particles from the composition of the liquid medium. The apparatus used for drying under reduced pressure includes a vacuum stirring type dryer, but any apparatus having the above function may be used, and is not particularly limited. In addition, the pressure value at the time of reducing pressure of the drying process is selected as appropriate.

By using the reduced pressure drying method, the removal efficiency of the liquid medium derived from the electromagnetic wave absorbing particle dispersion liquid is improved. In addition, since the electromagnetic wave absorbing particle dispersion powder obtained after the reduced pressure drying or the electromagnetic wave absorbing particle dispersion liquid used as the raw material is not exposed to high temperatures for a long time, the electromagnetic wave absorbing particle dispersion powder or the electromagnetic wave absorbing particles dispersed in the electromagnetic wave absorbing particle dispersion liquid are not agglomerated, and this is preferable. Furthermore, the productivity of the electromagnetic wave absorbing particle dispersion powder and the like is increased, and a solvent such as the evaporated liquid medium can be easily collected, which is preferable from the viewpoint of environmental considerations.

In the case of electromagnetic wave absorbing particle dispersion powder or the like, obtained after the drying process, it is preferable to remove a solvent component with a boiling point of 120° C. or lower. For example, the residual amount of the solvent component is preferably 2.5 wt % or less. This is because if the residual solvent component is 2.5 wt % or less, air bubbles are not generated when the electromagnetic wave absorbing particle dispersion powder or the like is processed into, for example, an electromagnetic wave absorbing particle dispersion, thereby maintaining a good appearance and excellent optical characteristics.

If the solvent component remaining in the electromagnetic wave absorbing particle dispersion powder is 2.5 wt % or less, agglomeration does not occur due to the natural drying of the residual solvent component when stored in the state of electromagnetic wave absorbing particle dispersion powder for a long period of time, and long-term stability is maintained.

In the resulting master batch, the dispersion concentration of the electromagnetic wave absorbing particles contained in the electromagnetic wave absorbing particle dispersion can be adjusted while maintaining the dispersion state of the particles by adding a solid medium and kneading the mixture.

The method for manufacturing the electromagnetic wave absorbing particle dispersion in accordance with the present embodiment may also include, as necessary, a molding process for molding the obtained master batch or the mixture in which a solid medium is added to the master batch as described above into an electromagnetic wave absorbing particle dispersion in a desired shape.

Specific method for forming the electromagnetic wave absorbing particle dispersion is not particularly limited, but a publicly known method such as extrusion molding, injection molding, or the like can be used.

In the molding process, electromagnetic wave absorbing particle dispersions can be made, for example, in a sheet shape, a board shape, or a film shape, which has a flat surface or a curved surface. The method for forming into a sheet shape, a board shape, or a film shape is not particularly limited, and various known methods can be used. For example, a calendar roll method, an extrusion method, a casting method, an inflation method, and the like can be used.

The method for manufacturing the electromagnetic wave absorbent particle dispersion in the present embodiment is not limited to the form having the master batch production process described above.

For example, the method for manufacturing the electromagnetic wave absorbing particle dispersion in the present embodiment may have the following process.

A precursor liquid preparation process for preparing an electromagnetic wave absorbing particle dispersion precursor liquid by mixing monomers of a solid medium, oligomers of the solid medium, and a solid medium precursor, which is uncured and in a liquid state, with the electromagnetic wave absorbing particles (electromagnetic wave absorbing particle dispersion powder) or the electromagnetic wave absorbing particle dispersion liquid, may be included.

An electromagnetic wave absorbing particle dispersion production process for producing the electromagnetic wave absorbing particle dispersion by curing the solid medium precursor such as the monomer, described above, by chemical reactions such as condensation or polymerization, may be included.

For example, when an acrylic resin is used as the solid medium, the acrylic monomer or acrylic-based ultraviolet curing resin can be mixed with the electromagnetic wave absorbing particles, so that the electromagnetic wave absorbing particle dispersion precursor liquid is obtained.

Then, the electromagnetic wave absorbing particle dispersion precursor liquid is filled into a predetermined mold and subjected to radical polymerization, to obtain an electromagnetic wave absorbing particle dispersion using an acrylic resin.

When a resin cured by crosslinking is used as the solid medium, the dispersion can be obtained by causing crosslinking the electromagnetic wave absorbing particle dispersion precursor liquid to be subjected to the crosslinking reaction, as in the above-described case with the acrylic resin.

(3) Additive Agents

When a medium resin is used as the solid medium, the electromagnetic wave absorbent particle dispersion in accordance with the present embodiment may also contain known additive agents (additive agents) such as plasticizers, flame retardants, coloration inhibitors, and fillers, which are typically added to these resins. However, as described above, the solid medium is not limited to a medium resin, and a binder using a metal alkoxide can be used.

The shape of the electromagnetic wave absorbing particle dispersion in accordance with the present embodiment is not particularly limited, but may take a form of, for example, a sheet shape, a board shape, or a film shape, as described above.

When the electromagnetic wave absorbing particle dispersion in the sheet shape, the board shape, or the film shape is used as a transparent base material intermediate layer such as a laminated glass, the solid medium contained in the electromagnetic wave absorbing particle dispersion may not have sufficient flexibility or adhesion with the transparent base material. In this case, the electromagnetic wave absorbing particle dispersion preferably contains a plasticizer. Specifically, for example, when the solid medium is polyvinyl acetal resin, and when the solid medium is used in the above-described applications, the electromagnetic wave absorbing particle dispersion preferably further contains a plasticizer.

As the above-described plasticizer, a material used as the plasticizer in the solid medium used for the electromagnetic wave absorbing particle dispersion according to the present embodiment can be used. For example, the plasticizer used in the electromagnetic wave absorbing particle dispersion made of polyvinyl acetal resin includes a plasticizer which is a compound of a monohydric alcohol and an organic acid ester, a plasticizer which is an ester-based such as a polyhydric alcohol organic acid ester compound, and a plasticizer which is a phosphate-based such as an organic phosphoric plasticizer. Any of the plasticizers are preferably liquid at room temperature. Among them, a plasticizer, which is an ester compound synthesized from a polyhydric alcohol and a fatty acid, is preferable.

(4) Example of Application

The electromagnetic wave absorbing particle dispersion in the present embodiment can be used in various modes, and its use and the application mode are not particularly limited. Hereinafter, as the application example of the electromagnetic wave absorbing particle dispersion in accordance with the present embodiment, an electromagnetic wave absorbing transparent base material, an electromagnetic wave absorbing intermediate film, and an electromagnetic wave absorbing laminate will be described.

(4-1) Electromagnetic Wave Absorbing Transparent Base Material

The electromagnetic wave absorbing transparent base material according to the present embodiment is provided with a transparent base material and an electromagnetic wave absorbing layer on at least one surface of the transparent base material, and the electromagnetic wave absorbing layer may be the aforementioned electromagnetic wave absorbing particle dispersion.

The electromagnetic wave absorbing transparent base material of the present embodiment may have a transparent base material as described above. As the transparent base material, for example, one or more types selected from a transparent film base material and a transparent glass base material may be preferably used.

The film base material is not limited to a film shape, and may be, for example, a board shape or a sheet shape. As a material of the film base material, one or more types selected from polyester resin, acrylic resin, urethane resin, polycarbonate resin, polyethylene resin, ethylene vinyl acetate copolymer, vinyl chloride resin, fluorine resin, and the like, can be suitably used, and can be used according to various purposes. However, the material of the film base material is preferably polyester resin, and particularly, the film base material is more preferably polyethylene terephthalate resin (PET resin). That is, the film base material is preferably a polyester resin film, and more preferably a polyethylene terephthalate resin film.

When a film base material is used as the transparent base material, a surface of the film base material is preferably subjected to a surface treatment to facilitate the adhesion of the electromagnetic wave absorbing layer.

In order to improve the adhesion between the glass base material or the film base material and the electromagnetic wave absorbing layer, a configuration in which an intermediate layer is formed on the glass base material or on the film base material, and the electromagnetic wave absorbing layer is formed on the intermediate layer is also preferable. The configuration of the intermediate layer is not particularly limited. For example, the intermediate layer may be configured by a polymer film, a metal layer, an inorganic layer (e.g., a layer of an inorganic oxide such as silica, titania, or zirconia), or an organic/inorganic composite layer.

Because the electromagnetic wave absorbing particle dispersion has already been described, the description thereof will be omitted here. The shape of the electromagnetic wave absorbing particle dispersion is not particularly limited, but preferably includes, for example, a sheet shape, a board shape, or a film shape.

A method for manufacturing the electromagnetic wave absorbing transparent base material according to the present embodiment will be described.

The electromagnetic wave absorbing transparent base material according to the present embodiment can be manufactured by forming on the transparent base material an electromagnetic wave absorbing layer that is an electromagnetic wave absorbing particle dispersion in which the electromagnetic wave absorbing particles are dispersed in a solid medium, using, for example, the aforementioned electromagnetic wave absorbing particle dispersion liquid.

Therefore, the method for manufacturing the electromagnetic wave absorbing transparent base material according to the present embodiment may include, for example, the following processes.

The method includes an application process for applying an application liquid containing the aforementioned electromagnetic wave absorbing particle dispersion liquid is applied to the surface of the transparent base material; and an electromagnetic wave absorbing layer forming process for forming the electromagnetic wave absorbing layer after a liquid medium in the application liquid is evaporated.

For example, the application liquid used in the application process can be prepared by adding a solid medium such as a resin, or a metal alkoxide; or a solid medium precursor to the electromagnetic wave absorbing particle dispersion liquid, described above, and mixing.

The solid medium precursor refers to one or more types selected from a monomer or an oligomer of the solid medium, and an uncured solid medium, as previously described.

When an electromagnetic wave absorbing layer, which is a coating film, is formed on the transparent base material, the electromagnetic wave absorbing layer becomes a state in which cesium tungsten oxide particles are dispersed in a solid medium. For this reason, the electromagnetic wave absorbing layer serves as an electromagnetic wave absorbing particle dispersion. In this way, by providing an electromagnetic wave absorbing particle dispersion on the surface of the transparent base material, the electromagnetic wave absorbing transparent base material can be prepared.

Because the solid medium and the solid medium precursor have been described in the item (1) Electromagnetic wave absorbing particle dispersion and the item (2) Method for manufacturing the electromagnetic wave absorbing particle dispersion, description thereof will be omitted here.

The method for applying the application liquid onto the transparent base material in order to provide the electromagnetic wave absorbing layer on the transparent base material, may be a method for uniformly applying an application liquid on a surface of a transparent base material, and is not particularly limited. The method includes, for example, a bar coat method, a gravure-coat method, a spray-coat method, a dip-coat method, a spin-coat method, a screen printing, a roll-coat method, and a flow coating.

In the following, a procedure of preparing an electromagnetic wave absorbing layer on the surface of the transparent base material will be described, in an example that an electromagnetic wave absorbing layer is formed by using an ultraviolet-curing resin as the medium resin and performing the application using a bar coat method.

An application liquid having a concentration and an additive agent adjusted appropriately to provide an adequate leveling property is applied onto the transparent base material using a wire bar with a bar number which is capable of meeting the thickness of the electromagnetic wave absorbing layer and the content of the electromagnetic wave absorbing particles in a purposive way. Then, a solvent such as a liquid medium contained in the application liquid, is removed by drying, and then irradiated with ultraviolet light to cure, so that a coating layer that is the electromagnetic wave absorbing layer can be formed on the transparent base material.

The drying condition of an application film varies depending on the ingredients, the type, and the use rate of the solvent, but typically it is about 20 seconds to 10 minutes at a temperature of 60° C. to 140° C. inclusive. The ultraviolet irradiation is not particularly limited, and an ultraviolet exposure apparatus such as an ultra-high pressure mercury lamp may be suitably used.

In addition, it is possible to manipulate the adhesion between the base material and the electromagnetic wave absorbing layer, smoothness of the application film during coating, and dryness of the organic solvent by processes before and after the formation of the electromagnetic wave absorbing layer (pre-process and post-process). Examples of the pre-process and the post-process include a surface treatment process for the base material, a pre-baking process (pre-heating the base material), and a post-baking process (post-heating the base material), which can be appropriately selected. The heating temperature in the pre-baking process or the post-baking process is preferably, for example, 80° C. to 200° C. inclusive, and the heating time is preferably 30 seconds to 240 seconds inclusive.

The method for producing the electromagnetic wave absorbing transparent base material according to the present embodiment is not limited to the above-described method. Other configuration examples of the method for producing the electromagnetic wave absorbing transparent base material according to the present embodiment include the following processes.

The method includes
an electromagnetic wave absorbing particle dispersion liquid application and drying process for applying the above-described electromagnetic wave absorbing particle dispersion liquid on a surface of the transparent base material and drying the dispersion liquid; and
a binder application and curing process for applying a binder using a solid medium such as a resin or a metal alkoxide, or a solid medium precursor on the surface applied with the electromagnetic wave absorbing particle dispersion liquid, and curing the binder.

In this case, according to the electromagnetic wave absorbing particle dispersion liquid application and drying process, a film in which electromagnetic wave absorbing particles are dispersed is formed on the surface of the transparent base material. The electromagnetic wave absorbing particle dispersion liquid can be applied by the same method as the method described for the application process in the above-described method for producing the electromagnetic wave absorbing transparent base material.

Then, the binder is applied onto the film in which the electromagnetic wave absorbing particles are dispersed and cured, so that the cured binder is disposed among the electromagnetic wave absorbing particles, thereby forming the electromagnetic wave absorbing layer.

The electromagnetic wave absorbing transparent base material can also have a coating layer on the surface of the electromagnetic wave absorbing particle dispersion. That is, a multi-layer film may be provided.

The coating layer may be an oxide coating film containing oxides of one or more types of elements selected from, for example, Si, Ti, Zr, and Al. In this case, the coating layer can be formed, for example, by applying onto the electromagnetic wave absorbing layer an application liquid containing one or more types selected from an alkoxide containing any one or more types of Si, Ti, Zr, or Al, and a partially hydrolyzed condensation polymer of the alkoxide, and then heating the application liquid.

By providing the coating layer, a coated component fills a space among the deposited electromagnetic wave absorbing particles in the first layer, so that the film is formed to suppress refraction of visible light, thereby reducing the haze value of the film and improving the visible light transmittance. In addition, a bindability of the electromagnetic wave absorbing particles to the base material can be improved.

Here, as the method for forming a coating film composed of an alkoxide containing any one or more types of Si, Ti, Zr, or Al or a partially hydrolyzed condensation polymer thereof on the electromagnetic wave absorbing particles alone or on the film containing the electromagnetic wave absorbing particles, the application method is preferable from the viewpoint of ease of the film forming operation and cost.

As the coating liquid used in the above-described application method, a liquid containing in a solvent such as water or an alcohol an alkoxide containing any one or more types of Si, Ti, Zr, or Al, or one or more types of partially hydrolyzed condensation polymers thereof may be suitably used. The content of the alkoxide and the like in the coating liquid is not particularly limited, but is preferably, for example, 40 wt % or less in terms of an oxide in the coating obtained after heating. The pH can also be adjusted by adding acid or alkali, as necessary.

By applying the coating liquid as the second layer on the film containing the electromagnetic wave absorbing particles as the main component and heating the coating liquid, an oxide coating film, which is the coating layer, containing one or more types selected from Si, Ti, Zr, and Al can be easily formed. An organosilazane solution is also preferably used as the binder component in the application liquid or a component of the coating liquid in accordance with the present embodiment.

The heating temperature for the base material, after the application of the electromagnetic wave absorbing particle dispersion liquid or the coating liquid containing a metal alkoxide of any one or more types of Si, Ti, Zr, or Al and a hydrolyzed polymer thereof as an inorganic binder or a coating film, is not particularly limited. For example, the heating temperature for the base material is preferably higher than or equal to 100° C., and more preferably higher than or equal to the boiling point of the solvent in the application liquid such as the electromagnetic wave absorbing particle dispersion liquid.

This is because the polymerization reaction of the metal alkoxide or the hydrolyzed polymer of the metal alkoxide contained in the application film can be completed when the heating temperature for the base material is 100° C. or higher. In addition, when the heating temperature for the base material is 100° C. or higher, there is almost no residue of the solvent, such as water or an organic solvent, in the film. Therefore, in the film after heating, these solvents do not cause a decrease in the visible light transmittance.

The thickness of the electromagnetic wave absorbing layer on the transparent base material of the electromagnetic wave absorbing transparent base material according to the present embodiment is not particularly limited. However, the thickness of the electromagnetic wave absorbing layer is preferably 10 μm or less in practice, and more preferably 6 μm or less. This is because, if the thickness of the electromagnetic wave absorbing layer is 10 μm or less, the absorbing layer exhibits a sufficient pencil hardness to have an abrasion resistance, and in addition, it is possible to avoid an occurrence of a process abnormality such as an occurrence of warping of the base material film during volatilization of the solvent and curing of the binder in the electromagnetic wave absorbing layer.

(4-2) Electromagnetic Wave Absorbing Intermediate Film and the Electromagnetic Wave Absorbing Laminate The electromagnetic wave absorbing laminate according to the present embodiment may have a laminated structure including the aforementioned electromagnetic wave absorbing particle dispersion, and the transparent base material, as elements, and may be a laminate in which these elements are laminated.

The electromagnetic wave absorbing laminate includes, for example, a laminate in which two or more sheets of transparent base materials and the above-described electromagnetic wave absorbing particle dispersion are laminated. In this case, the electromagnetic wave absorbing particle dispersion is disposed between, for example, the transparent base materials, and can be used as the electromagnetic wave absorbing intermediate film.

In this case, the electromagnetic wave absorbing intermediate film preferably has a shape of any of a sheet shape, a board shape, or a film shape.

As the transparent base material, one or more types selected from flat glass, sheet-like plastic, or film-like plastic, which is transparent in the visible light region, can be suitably used.

When a plastic is used as the transparent base material, a material of the plastic is not particularly limited, but may be selected depending on the application. For example, one or more types selected from polycarbonate resin, acrylic resin, polyester resin, polyamide resin, vinyl chloride resin, olefin resin, epoxy resin, polyimide resin, ionomer resin, fluorine resin, or the like, may be used. As the polyester resin, polyethylene terephthalate resin may be suitably used.

The transparent base material may contain particles having a solar radiation shielding function. As the particles having the solar radiation shielding function, electromagnetic wave absorbing particles having near infrared shielding characteristics can be used.

By interposing the aforementioned electromagnetic wave absorbing particle dispersion as a configuration member of the intermediate layer held between the plurality of sheets of the transparent base material, a solar radiation shielding structure, which is a type of an electromagnetic wave absorbing laminate having the near-infrared shielding function while transmitting visible light, can be obtained.

In addition, the above-described electromagnetic wave absorbing laminate may be formed by bonding the plurality of sheets of the transparent base materials, opposite to each other, holding the electromagnetic wave absorbing particle dispersion in between, to each other and integrating them with each other using a known method.

When the aforementioned electromagnetic wave absorbing particle dispersion is used as the electromagnetic wave absorbing intermediate film, as the solid medium, the medium described for the electromagnetic wave absorbing particle dispersion may be used. However, the solid medium is preferably polyvinyl acetal resin from a viewpoint of increasing the adhesion strength between the electromagnetic wave absorbing intermediate film and the transparent base material.

The electromagnetic wave absorbing intermediate film according to the present embodiment can be produced by the method for producing the aforementioned electromagnetic wave absorbing particle dispersion, and can be, for example, an electromagnetic wave absorbing intermediate film having a sheet shape, a board shape, or a film shape.

When the electromagnetic wave absorbing intermediate film does not have sufficient flexibility or sufficient adhesion with the transparent base material, a liquid plasticizer for the medium resin is preferably added. For example, when the medium resin used for the electromagnetic wave absorbing intermediate film is polyvinyl acetal resin, adding a liquid plasticizer for polyacetal resin is beneficial for improving the adhesion between the intermediate film and the transparent base material.

As the plasticizer, a material used as a plasticizer for the medium resin can be used. For example, the plasticizer used for the infrared-shielding film formed of polyvinyl acetal resin includes, a plasticizer which is a compound of a monohydric alcohol and an organic acid ester, an ester-based plasticizer such as a polyhydric alcohol organic acid ester compound, and a phosphoric acid-based plasticizer such as an organic phosphoric acid-based plasticizer. Any of the plasticizers are preferably liquid at the room temperature. Among them, a plasticizer, which is an ester compound synthesized from a polyhydric alcohol and a fatty acid, is preferable.

Moreover, at least one types selected from the group consisting of a silane coupling agent, a metal salt of a carboxylic acid, a hydroxide of a metal, and a carbonate of a metal can be added to the electromagnetic wave absorbing intermediate film. The metal configuring the metal salt of a carboxylic acid, the hydroxide of the metal, and the carbonate of the metal is not particularly limited, but preferably at least one types selected from sodium, potassium, magnesium, calcium, manganese, cesium, lithium, rubidium, and zinc. In the electromagnetic wave absorbing intermediate film, the content of at least one types selected from the group consisting of the metal salt of a carboxylic acid, the hydroxide of the metal, and the carbonate of the metal, is preferably 1 wt % or more and 100 wt % or less with respect to the electromagnetic wave absorbing particles.

Furthermore, in addition to the aforementioned electromagnetic wave absorbing particles, the electromagnetic wave absorbing intermediate film may contain at least one or more types of particles among oxide particles, composite oxide particles, and boride particles including two or more types of elements selected from the group consisting of Sb, V, Nb, Ta, W, Zr, F, Zn, Al, Ti, Pb, Ga, Re, Ru, P, Ge, In, Sn, La, Ce, Pr, Nd, Gd, Tb, Dy, Ho, Y, Sm, Eu, Er, Tm, Tb, Lu, Sr, and Ca, as necessary. The electromagnetic wave absorbing intermediate film may contain 5 wt % to 95 wt % of the above-described particles when the total of the intermediate film and the electromagnetic wave absorbing particles is 100 wt %.

The electromagnetic wave absorbing laminate may contain an ultraviolet absorbent in at least one layer of an intermediate film disposed between the transparent base materials. Suitable ultraviolet absorbent includes one or more types selected from a compound having a malonic ester structure, a compound having an oxalate anilide structure, a compound having a benzotriazole structure, a compound having a benzophenone structure, a compound having a triazine structure, a compound having a benzoate structure, a compound having a hindered amine structure, and the like.

It should be noted that the intermediate layer of the electromagnetic wave absorbing laminate may be composed only of the electromagnetic wave absorbing intermediate film according to the present embodiment.

The electromagnetic wave absorbing intermediate film described here is one aspect of the electromagnetic wave absorbing particle dispersion. Of course, the electromagnetic wave absorbing particle dispersion in accordance with the present embodiment can be used without being held by two or more transparent base materials that are transparent to visible light. In other words, the electromagnetic wave absorbing particle dispersion according to the present embodiment can be independently established as an electromagnetic wave absorbing particle dispersion.

The electromagnetic wave absorbing laminate according to the present embodiment is not limited to the form in which the electromagnetic wave absorbing particle dispersion is arranged between the transparent base materials as described above. The electromagnetic wave absorbing laminate may have any configuration, as long as the laminate has a laminated structure including the electromagnetic wave absorbing particle dispersion and the transparent base material.

EXAMPLE

Hereinafter, the present invention will be described in more detail with reference to examples. However, the present invention is not limited to the following examples.

First, the evaluation method in the following examples and comparative examples will be described.
(Chemical Analysis)

The chemical analysis for the resulting electromagnetic wave absorbing particles was performed by the atomic absorption spectrometry (AAS) for Cs, and the ICP optical emission spectrometry (1CP-OES) for W (tungsten). For O, a light element analyzer (model ON-836, manufactured by LECO Japan Corporation) was used to analyze CO gas, which was produced in the reaction with carbon from the sample melted in the atmosphere of He gas in a crucible, by the IR absorption spectroscopy. TABLE 1 shows composition ratios when W (tungsten) is 1, based on a content ratio of each element obtained by the chemical analysis. In Examples 1 to 13 below, a powder that is electromagnetic wave absorbing particles containing a cesium tungsten composite oxide having W loss is obtained. Therefore, for each of powder A to powder M that are the electromagnetic wave absorbing particles obtained in Examples 1 to 13, it was confirmed that the composition ratio, obtained by multiplying the composition ratio when W is 1 shown in TABLE 1 by the value according to the W loss, satisfied the general formula $Cs_xW_{1-y}O_{3-z}$ ($0.2 \le x \le 0.4$, $0 < y \le 0.4$, and $0 < z \le 0.46$).
(X-Ray Diffraction Measurement)

The X-ray diffraction measurement was performed by the powder XRD measurement using Cu-Kα ray with a X'Pert-PRO/MPD apparatus by Spectris Co., Ltd.

The measurement was performed after calibrating diffraction angles with the standard sample (NIST640e). The resulting XRD diffraction pattern was then subjected to the Rietveld analysis to determine the lattice constant of the crystalline phase. If an orthorhombic crystal structure is included, the result is indicated by R in TABLE 1, and if a hexagonal crystal structure is included, the result is indicated by H. If an orthorhombic crystal structure and hexagonal crystal structure are included, the result is indicated by R+H in TABLE 1.

For the mixed phase of the orthorhombic crystal structure and the hexagonal crystal structure, the lattice constant for each phase was determined. Then, the lattice constant of the orthorhombic crystal structure was converted to the lattice constant of the hexagonal crystal structure using the following lattice-corresponding model. Corresponding to the variation of the lattice between the orthorhombic crystal structure and the hexagonal crystal structure, the lattice constant in terms of a hexagonal crystal structure was determined by using the equation $4a_{orth}^2 + b_{orth}^2 = 64a_{hex}^2 = 64b_{hex}^2$, $c_{orth} = c_{hex}$, extracted from the model of Solodovnikov 1998 (Non-Patent Document 4). In the above equation, $a_{orth}$, $b_{orth}$, and $c_{orth}$ represent the lengths of a-axis, b-axis, and c-axis of the orthorhombic crystal structure, respectively. Moreover, $a_{hex}$, $b_{hex}$, and $c_{hex}$ represent the lengths of a-axis, b-axis, and c-axis of the hexagonal crystal structure, respectively.
(Optical Characteristics of Electromagnetic Wave Absorbing Transparent Base Material)

The visible light transmittance (VLT) and solar radiation transmittance (ST) of the electromagnetic wave absorbing transparent base material were measured in accordance with ISO 9050 and JIS R 3106. Specifically, the transmittance was measured using a spectrophotometer U-4100 by Hitachi, Ltd. and calculated by multiplying by a factor according to the spectrum of sunlight. The transmittance was measured at 5 nm intervals in the range from 300 nm to 2100 nm inclusive. Tristimulus values X, Y, and Z were calculated for the D65 standard light source with the light source angle of 10° according to JIS Z 8701, and the L*a*b* color indices were obtained from the tristimulus values X, Y, and Z according to JIS Z 8729. The RGB color indices were also calculated from tristimulus values in the same manner as above.

Example 1

A kneaded material, obtained by weighing cesium carbonate ($Cs_2CO_3$) and tungsten trioxide ($WO_3$) in a molar ratio of $Cs_2CO_3:WO_3=2:11$, mixing, and kneading, was placed in a carbon boat and heated twice at 850° C. for 20 hours in a tubular furnace in the atmosphere to obtain powder A' that is a faint light green, white powder. During the heating, after heating at 850° C. for 20 hours, the mixture was taken out, pulverized, and mixed, and then heated again under the same condition.

The resulting powder A', which was white powder, was evaluated as follows.

The X-ray powder diffraction pattern was identified as almost the single-phase of $Cs_4W_{11}O_{35}$ (ICDD 00-51-1891), although the pattern was slightly mixed with $Cs_6W_{11}O_{36}$.

The lattice constants were measured as a=14.6733 Å, b=52.3841 Å, and c=7.7424 Å. These values were very close to the values by Solodovnikov (Non-Patent Document 4), a=14.6686 Å, b=52.3971 Å, and c=7.7356 Å. The chemical analysis result of this white powder yielded $Cs_{0.36}WO_{3.18}$, which was almost consistent with the weighed composition.

Figure 4:
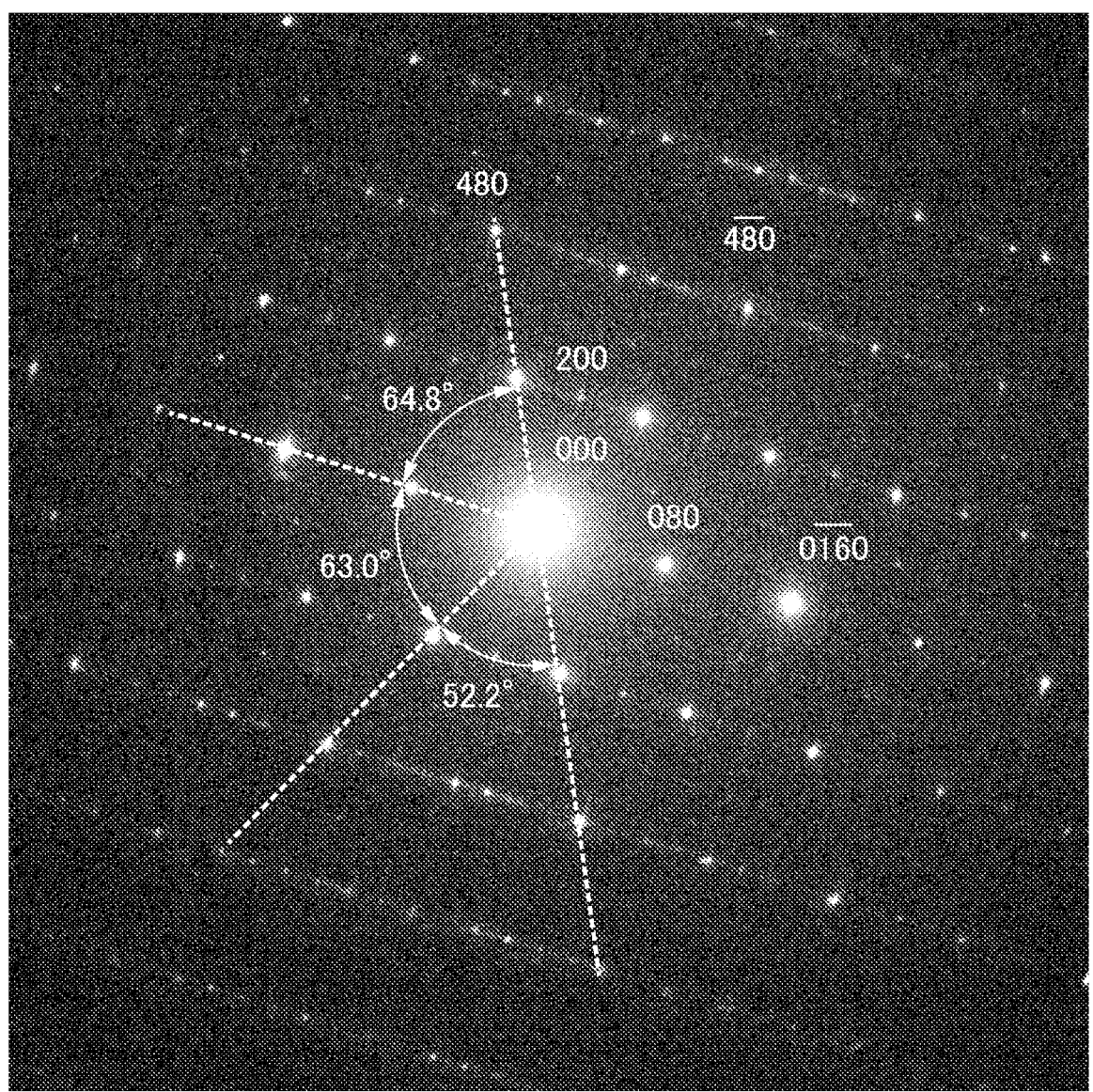
FIG. 4 is an electron beam diffraction image taken from the c-axis direction of powder A' obtained in Example 1.

Next, a TEM observation for the resulting powder A', which was white powder, was performed. A selected area electron beam diffraction pattern yielded a spot pattern of the orthorhombic crystal structure. FIG. 4 shows a spot pattern taken from the c-axis direction of the orthorhombic crystal structure. A periodicity with a cycle of b/8 appears in the b-axis direction, and presence of the loss plane of W and O was confirmed. A b/8 cycle in the b-axis direction confirmed the presence of the defective planes of W and O. From a streak running in the b-axis direction, some plane defects were found to be present on the b plane. The spot pattern for the c-axis crystal zone axis is close to the 6-fold symmetry, but an angle between a (480) spot and a (4-80) spot is 52.2°, which deviates from 60° for the case of the 6-fold symmetry. This deviation from the 6-fold symmetry is considered to be caused by the loss plane of W and O entering the b/8 cycle.

The resulting $Cs_4W_{11}O_{35}$ powder, which was white powder, was spread over a carbon boat in a thin flat manner, placed in the tubular furnace, and heated to 800° C. from the room temperature in an Ar gas stream. The stream was switched to a stream in which Ar gas was a carrier and a $H_2$ gas of 1 vol % (hereinafter volume % will be simply referred to as %) was mixed, while maintaining the temperature at 800° C., and after reduction for 5 minutes, $H_2$ gas was stopped, and the powder was slow-cooled to 100° C. only with the Ar gas stream, and then stopped with the Ar gas stream, slow-cooled to the room temperature. After doing so, a powder A was taken out. The color tone of the taken-out powder A was light blue.

The XRD pattern of the powder A showed a two-phase mixing pattern of an orthorhombic crystal structure and a hexagonal crystal structure. The lattice constants for the phases determined by using the Rietveld method were a=14.6609 Å, b=52.4040 Å, and c=7.7419 Å for the orthorhombic crystal structure (values in terms of a hexagonal crystal structure were a=7.5062 Å, and c=7.7419 Å), and for the hexagonal crystal structure a=7.4170 Å, and c=7.5752 Å. Both values for the c-axis were confirmed to fall within the range of 7.560 Å c 7.750 Å.

Next, the TEM observation for the powder A was performed, and orthorhombic crystal structure particles and pseudo-hexagonal crystal structure particles were observed.

Figure 5:
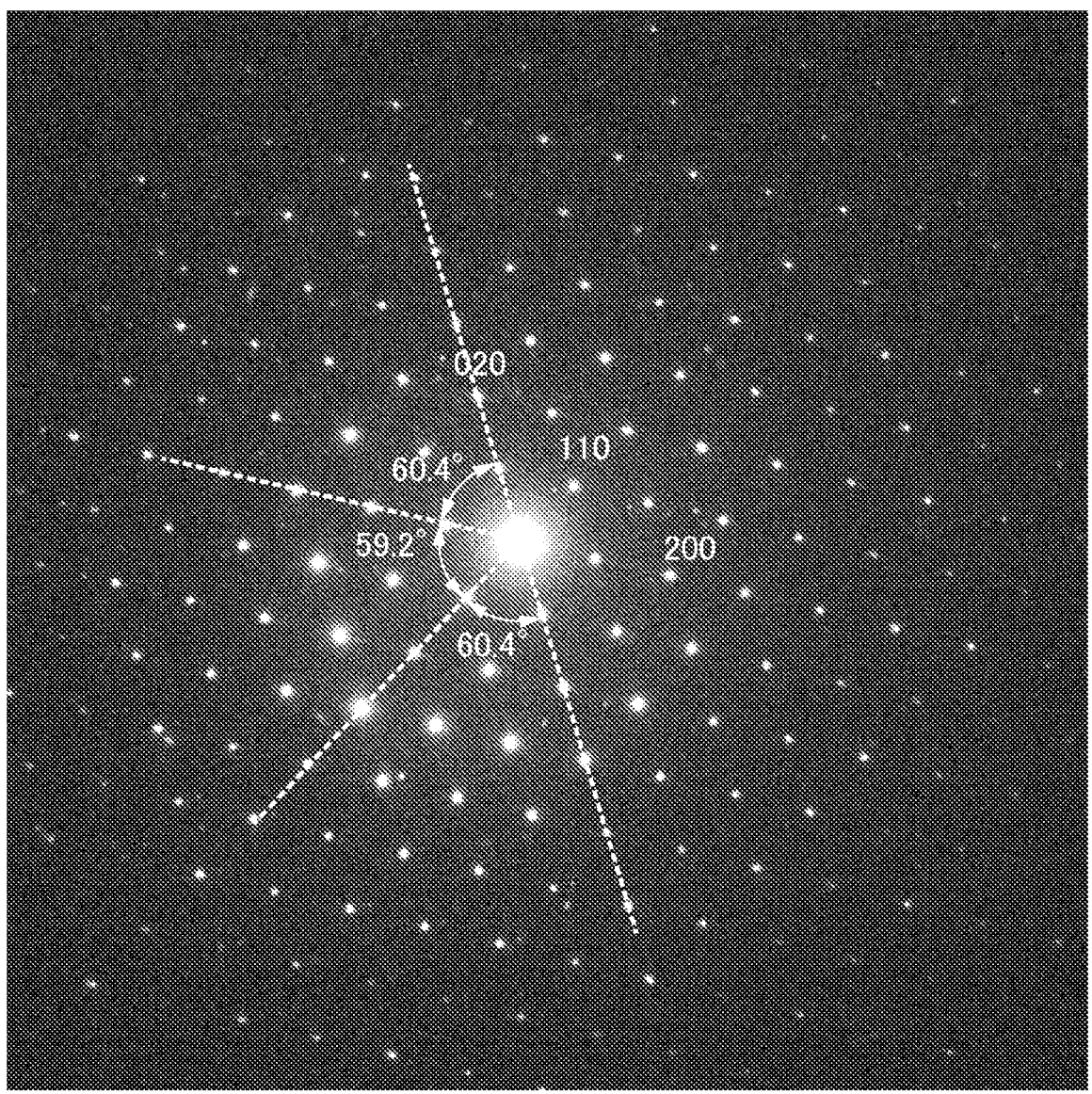
FIG. 5 is an electron beam diffraction image of the $[001]_{HEX}$ crystal zone axis of a pseudo-hexagonal crystal structure particle of powder A obtained in Example 1.

Here, an electron beam diffraction image of the pseudo-hexagonal particles is shown in FIG. 5. The pseudo-hexagonal crystal structure particles exhibited a diffraction pattern close to that of the hexagonal crystal structure, as shown by the electron beam diffraction image for the $[001]_{HEX}$ crystal zone axis of FIG. 5. Here, an angle between the $(200)_{HEX}$ plane and the $(110)_{HEX}$ plane was measured to be 59.2°, which was close to the hexagonal crystal structure.

The powder A was then observed in the STEM-HAADF mode (STEM: scanning transmission electron microscopy, HAADF: High-angle annular dark field).

Figure 6:
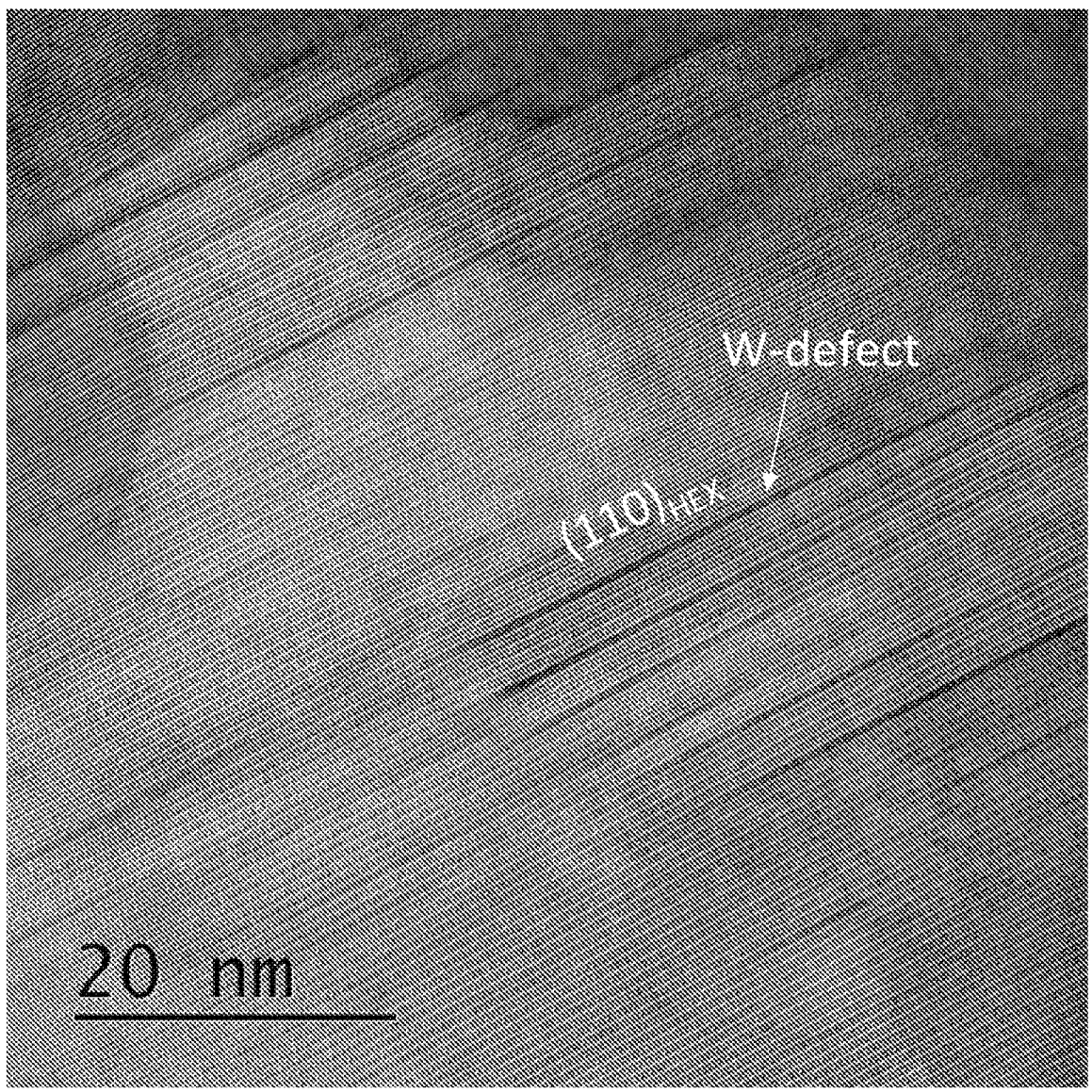
FIG. 6 is a STEM-HAADF image of the pseudo-hexagonal crystal structure particle of powder A obtained in Example 1 observed from the crystal zone axis.

A HAADF image observed from the [221] crystal zone axis of the pseudo-hexagonal crystal structure particle is shown in FIG. 6. Since a particle of atom was observed in HAADF mode with a brightness proportional to the atomic number and probability of presence of the atom in the projection direction, a linear region darkly appearing along $(110)_{HEX}$ in FIG. 6 was identified as loss of W with the greatest atomic number. A trace of such a W-loss region was found to extend in a planar manner in $(110)_{HEX}$ according to the observation in a different direction. In addition, a part of a trace with a thin contrast is considered to contract linearly.

In this example, the heating reduction process was 5 minutes, which was shorter than the other examples described below. In the early stage of the reduction at high temperature, the W defect of the orthorhombic crystal structure $(010)_{ORTH}$ contracted and a structural transition occurred to the pseudo-hexagonal crystal structure. In the pseudo-hexagonal crystal structure, many W-loss regions were observed in the middle of the contraction in the $\{100\}_{HEX}$ plane.

Example 2

The $Cs_4W_{11}O_{35}$ powder, which was the powder A' obtained in Example 1, was spread over the carbon boat in a thin flat manner, placed in the tubular furnace, and heated from the room temperature to 800° C. in an Ar gas stream. While maintaining the temperature at 800° C., the stream was switched to a stream in which Ar gas was a carrier and a $H_2$ gas of 1% was mixed. After reduction for 15 minutes, $H_2$ gas was stopped, and the powder was slow-cooled to 100° C. only with the Ar gas stream, and then stopped with the Ar gas stream, slow-cooled to the room temperature, and a powder B was taken out. The color tone of the taken-out powder B was blue.

The XRD pattern of the powder B showed a two-phase mixing pattern of an orthorhombic crystal structure and a hexagonal crystal structure. The lattice constants for the phases determined by the Rietveld method were for the orthorhombic crystal structure a=14.6576 Å, b=52.4315 Å, and c=7.7412 Å (values in terms of a hexagonal crystal structure were a=7.5088 Å, and c=7.7412 Å), and for the hexagonal crystal structure a=7.4122 Å, and c=7.5940 Å. Both values for the c-axis were confirmed to fall within the range of 7.560 Å≤c≤7.750 Å.

Figure 7:
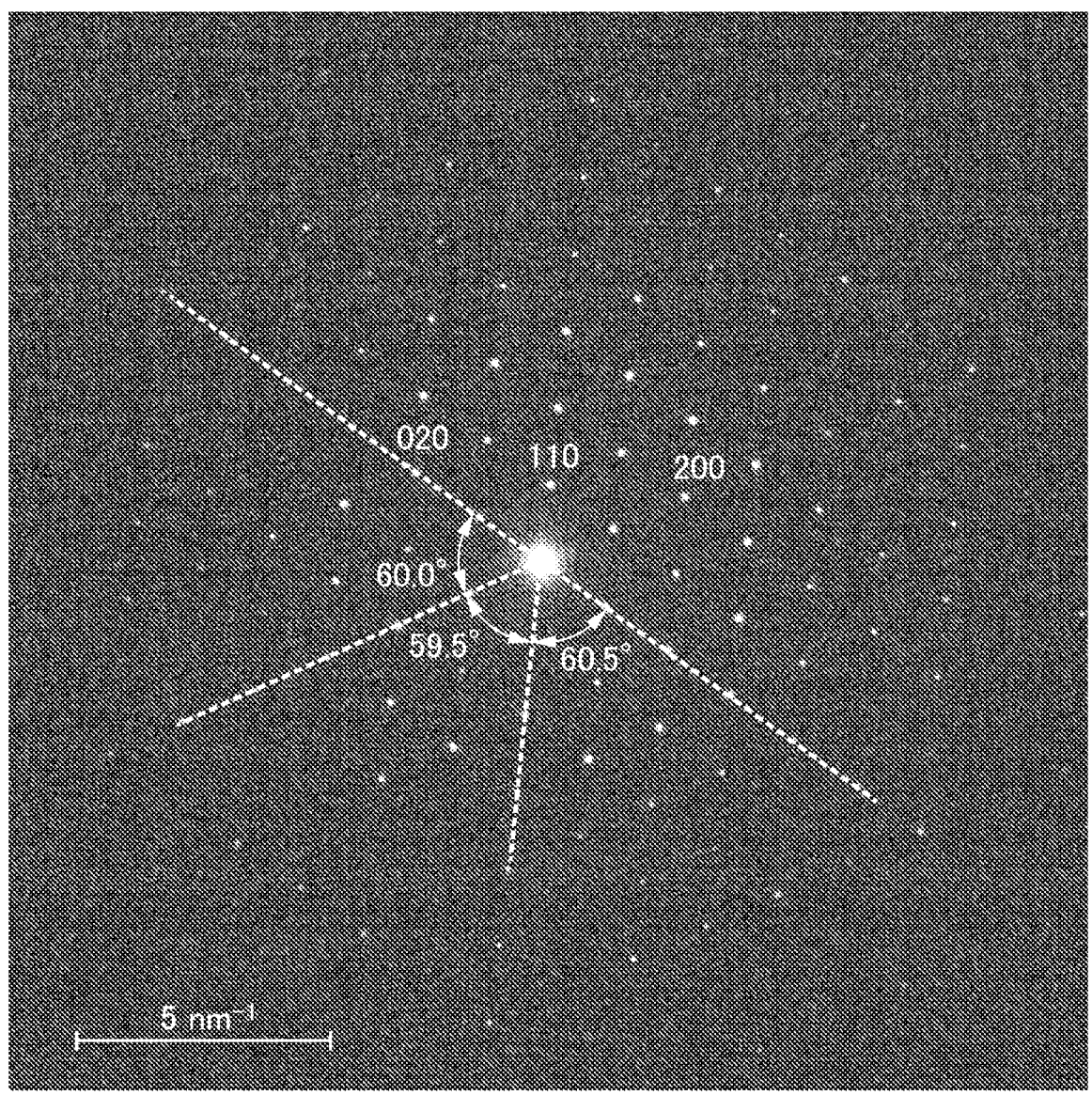
FIG. 7 is an electron beam diffraction image of the $[001]_{HEX}$ crystal zone axis of a pseudo-hexagonal crystal structure particle of powder B obtained in Example 2.

Next, the TEM observation for the powder B was performed, and orthorhombic crystal structure particles and pseudo-hexagonal crystal structure particles were observed as in the case of the powder A obtained in Example 1. The pseudo-hexagonal crystal structure particles exhibited a diffraction pattern close to that of the hexagonal crystal structure, as shown by the electron beam diffraction image for the $[001]_{HEX}$ crystal zone axis of FIG. 7. Here, an angle between the $(200)_{HEX}$ plane and the $(110)_{HEX}$ plane was measured to be 59.5°, which was close to the hexagonal crystal structure.

Example 3

The $Cs_4W_{11}O_{35}$ powder, which was the powder A' obtained in Example 1, was spread over the carbon boat in a thin flat manner, placed in the tubular furnace, and heated from the room temperature to 800° C. in an Ar gas stream. The stream was switched to a stream in which Ar gas was a carrier and a $H_2$ gas of 1% was mixed, while maintaining the temperature at 800° C., and after reduction for 30 minutes, $H_2$ gas was stopped, and the powder was slow-cooled to 100° C. only with the Ar gas stream, and then stopped with the Ar gas stream, slow-cooled to the room temperature, and a powder C was taken out. The color tone of the taken-out powder C was deep blue.

The XRD pattern of the powder C showed a two-phase mixing pattern of an orthorhombic crystal structure and a hexagonal crystal structure. The lattice constants for the phases determined by using the Rietveld method were for the orthorhombic crystal structure a=14.6649 Å, b=52.4010 Å, and c=7.7451 Å (values in terms of a hexagonal crystal structure were a=7.5064 Å, and c=7.7451 Å), and for the hexagonal crystal structure a=7.4076 Å, and c=7.6107 Å. Both values for the c-axis were confirmed to fall within the range of 7.560 Å c 7.750 Å.

Figure 8:
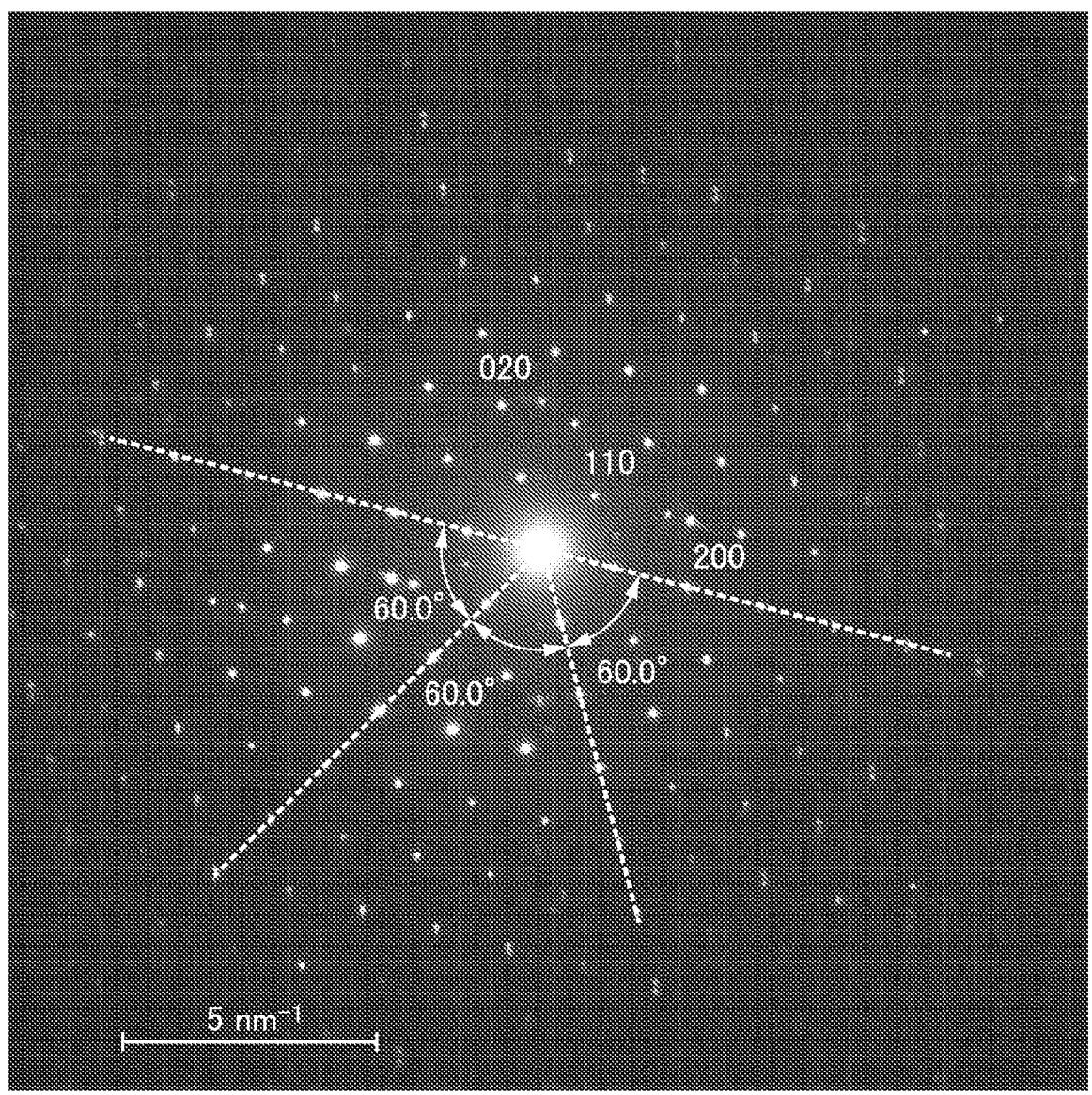
FIG. 8 is an electron beam diffraction image of the $[001]_{HEX}$ crystal zone axis of a pseudo-hexagonal crystal structure particle of powder C obtained in Example 3.

Next, the TEM observation for the powder C was performed, and orthorhombic crystal structure particles and pseudo-hexagonal crystal structure particles were observed, as in the case of the powder A obtained in Example 1. The pseudo-hexagonal crystal structure particles exhibited a diffraction pattern of a hexagonal crystal structure, as shown by the electron beam diffraction image for the [001] crystal zone axis of FIG. 8. Here, an angle between the $(200)_{HEX}$ plane and the $(110)_{HEX}$ plane was measured to be 60.0°, which was the value of the hexagonal crystal structure.

Examples 4 to 7

The reduction time for reducing the $Cs_4W_{11}O_{35}$ powder, which is powder A' obtained in Example 1, was changed to from 35 minutes to 90 minutes as shown in TABLE 1. Except for the above points, powder D, powder E, powder F, and powder G were prepared in the same manner as in the case of preparing powder A of Example 1. All powder color tones of powder D to powder G are deep blue, and the XRD lattice constants are as shown in the table.

As shown in TABLE 1, in Example 4, a phase of the orthorhombic crystal structure was also observed, and the c-axis length converted to a hexagonal crystal structure was 7.7440 Å (Example 4).

Examples 8 to 11

The temperature and the reduction time in the heating reduction process for the $Cs_4W_{11}O_{35}$ powder, which is powder A' obtained in Example 1, were changed as shown in TABLE 1. Specifically, the process was performed at 650° C. for 120 minutes in Example 8, 700° C. for 60 minutes in Example 9, 900° C. for 10 minutes in Example 10, and 950° C. for 20 minutes in Example 11. Except for the above points, powder H, powder I, powder J, and powder K were prepared in the same manner as in the case of preparing powder A of Example 1. Then, a light blue powder, a blue powder, a deep blue powder, and deep blue powder were obtained, respectively. The lattice constants obtained from the XRD patterns of the respective powders are shown in TABLE 1.

As shown in TABLE 1, phases of orthorhombic crystal structures were also observed in Examples 8 and 9 and in Examples 12 and 13, shown below, and the c-axis lengths in terms of a hexagonal crystal structure were 7.7428 Å (Example 8), 7.7471 Å (Example 9), 7.7449 Å (Example 12), and 7.7466 Å (Example 13).

Example 12

Cesium carbonate and tungsten trioxide were mixed in a molar ratio of $Cs_2CO_3:WO_3=3:11$, spread over the carbon boat in a thin flat manner, placed in the tubular furnace, and heated at 850° C. for 5 hours, to obtain a very thin greenish white powder. The main phase of this white powder was identified as $Cs_6W_{11}O_{36}$ (ICDD1-70-632), which was a mixed phase with $Cs_4W_{11}O_{35}$.

The resulting white powder was subjected to the heat treatment at 800° C. for 30 minutes in a 1% $H_2$—$N_2$ stream, and a deep blue powder L was obtained.

The XRD pattern of the powder L showed a two-phase mixing pattern of an orthorhombic crystal structure and a hexagonal crystal structure. The lattice constant obtained from the XRD pattern of the obtained powder L is shown in TABLE 1.

Example 13

Cesium carbonate and tungsten trioxide were mixed in a molar ratio of $Cs_2CO_3:WO_3=1:6$, spread over the carbon boat in a thin flat manner, placed in the tubular furnace, and heated at 850° C. for 5 hours, to obtain a very thin greenish white powder. The main phase of this white powder was identified as $Cs_4W_{11}O_{35}$, which was a mixed phase with $Cs_2W_6O_{19}$ (ICDD00-045-0522).

The resulting white powder was subjected to the heat treatment at 800° C. for 30 minutes in a 1% $H_2$—$N_2$ stream, and a deep blue powder M was obtained.

The XRD pattern of the powder M showed a two-phase mixing pattern of an orthorhombic crystal structure and a hexagonal crystal structure. The lattice constant obtained from the XRD pattern of the obtained powder M is shown in TABLE 1.

As shown in Examples 1 to 13 above, when the reduction process was performed for a white powder of $Cs_4W_{11}O_{35}$, or a white power of $Cs_4W_{11}O_{35}$ containing $Cs_6W_{11}O_{36}$, or $Cs_2W_6O_{19}$, at high temperature, color of the powder gradually changed from light blue to blue and then to deep blue.

Moreover, in the $Cs_4W_{11}O_{35}$ phase a lattice defect including W loss was present, and the $Cs_4W_{11}O_{35}$ phase was an orthorhombic crystal structure. It was confirmed that when the $Cs_4W_{11}O_{35}$ phase was reduced at high temperature, the lattice defect including W loss disappeared and the orthorhombic crystal structure changed to a hexagonal crystal structure.

Example 14

20 wt % of powder A prepared in Example 1, 10 wt % of an acrylic polymeric dispersant having a group containing an amine as a functional group (hereinafter, abbreviated as "dispersant a"), and 70 wt % of methyl isobutyl ketone (MIBK) as a solvent were weighed. The weighed materials were put in a glass container with silica beads having a diameter of 0.3 mm, and dispersed and pulverized using a paint shaker for 5 hours, to obtain a dispersion liquid A.

Here, when an average particle diameter of electromagnetic wave absorbing particles in the dispersion liquid A (dispersed particle diameter measured by ELS-8000 manufactured by Otsuka Electronics Co., Ltd., which was a particle diameter measurement apparatus based on a dynamic light scattering method) was measured, it was 26.4 nm.

100 parts by mass of the dispersion liquid A was mixed with 50 parts by mass of an ultraviolet-curing resin for hard coat (ARONIX UV-3701 by TOAGOSEI Co., Ltd.) to prepare an electromagnetic wave absorbing particle application liquid. The electromagnetic wave absorbing application liquid was then applied using a bar coater onto a polyethylene terephthalate (PET) resin film (HPE-50 by TEIJIN Limited; hereinafter, also referred to as "PET film"), which is a transparent film base material, to form an application film. In other embodiments, the same PET film was used as the transparent base material.

The PET film with the application film was dried at 80° C. for 5 minutes, and the organic solvent, which is a liquid medium, was evaporated. Then, the film was cured with a high-pressure mercury lamp, so that an electromagnetic wave absorbing film A, on which a coating layer containing electromagnetic wave absorbing particles was provided, was prepared. The coating layer is an electromagnetic wave absorbing layer, and the electromagnetic wave absorbing film is a form of an electromagnetic wave absorbing transparent base material.

Figure 9A:
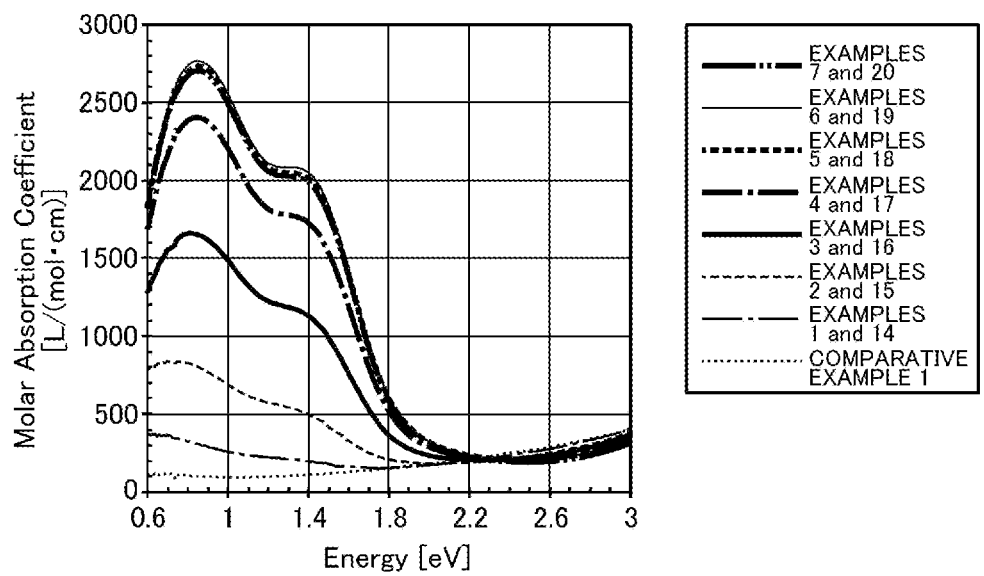
FIG. 9A shows molar absorption coefficients of dispersion liquids prepared in Examples 14 to 20 and Comparative Example 1.
Figure 9B:
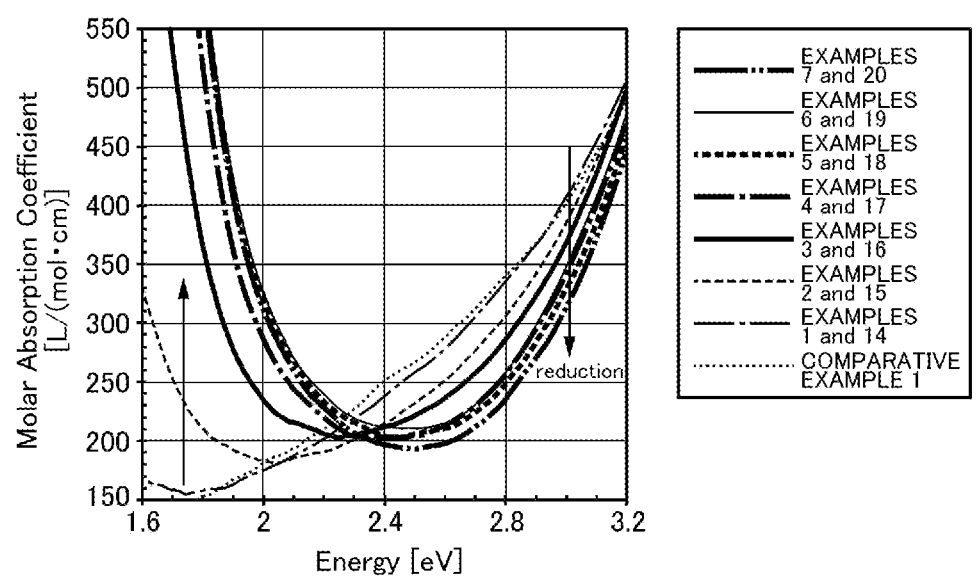
FIG. 9B shows molar absorption coefficients of dispersion liquids prepared in Examples 14 to 20 and Comparative Example 1.
Figure 9C:
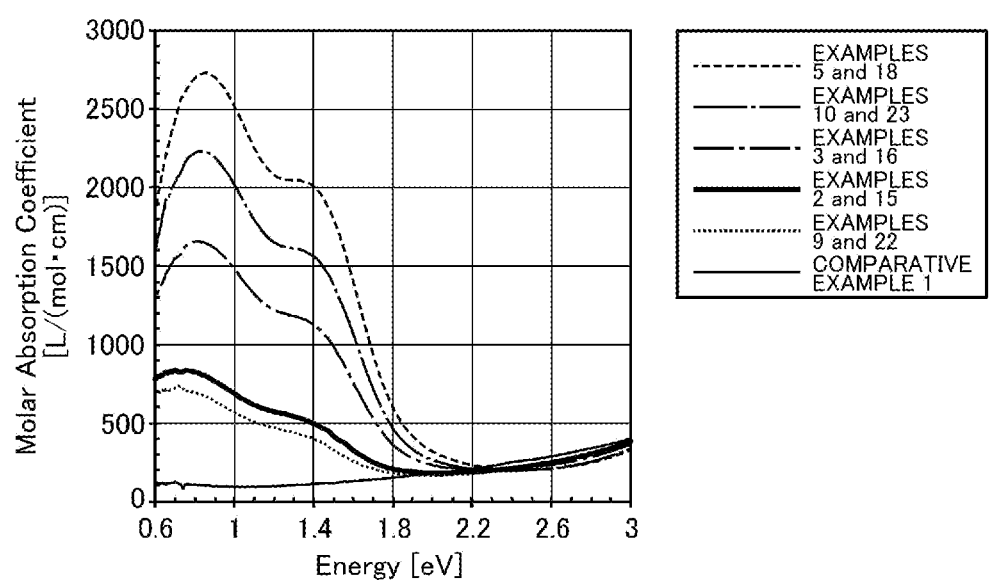
FIG. 9C show molar absorption coefficients of dispersion liquids prepared in Examples 15, 16, 18, 22, and 23 and Comparative Example 1.

A transmittance of the obtained dispersion liquid A was measured with a Spectrophotometer U-4100 by Hitachi High-Tech Science Corporation to determine the molar absorption coefficient. The profiles are shown in FIGS. 9A and 9B. FIG. 9A shows the molar absorption coefficients of the dispersion liquids in Examples 14 to 20, prepared using the electromagnetic wave absorbing particles prepared in Examples 1 to 7, and of the dispersion liquid in Comparative Example 1. FIG. 9B is a partially enlarged view of FIG. 9A. FIG. 9C shows the molar absorption coefficients of the dispersion liquids in Examples 15, 16, 18, 22, and 23, prepared using the electromagnetic wave absorbing particles prepared in Examples 2, 3, 5, 9, and 10, and of the dispersion liquid in Comparative Example 1.

According to the profile shown in FIG. 9, absorption in the near infrared region of 0.6 eV to 1.6 eV inclusive, and transmission in the visible region of 1.6 eV to 3.0 eV inclusive, were confirmed.

The visible light transmittance (VLT) and the solar radiation transmittance (ST) of the electromagnetic wave absorbing film A were measured to be VLT=72.3% and ST=55.3%, respectively. It was found that the film is transparent to visible light and has a near infrared absorption effect, in the same manner as the dispersion liquid A. The color indices of the electromagnetic wave absorbing film A were L*=88.4, a*=1.4, and b*=8.8, indicating that very weak blue color and being close to neutral color, i.e., a neutral color tone.

Example 15

Figure 10A:
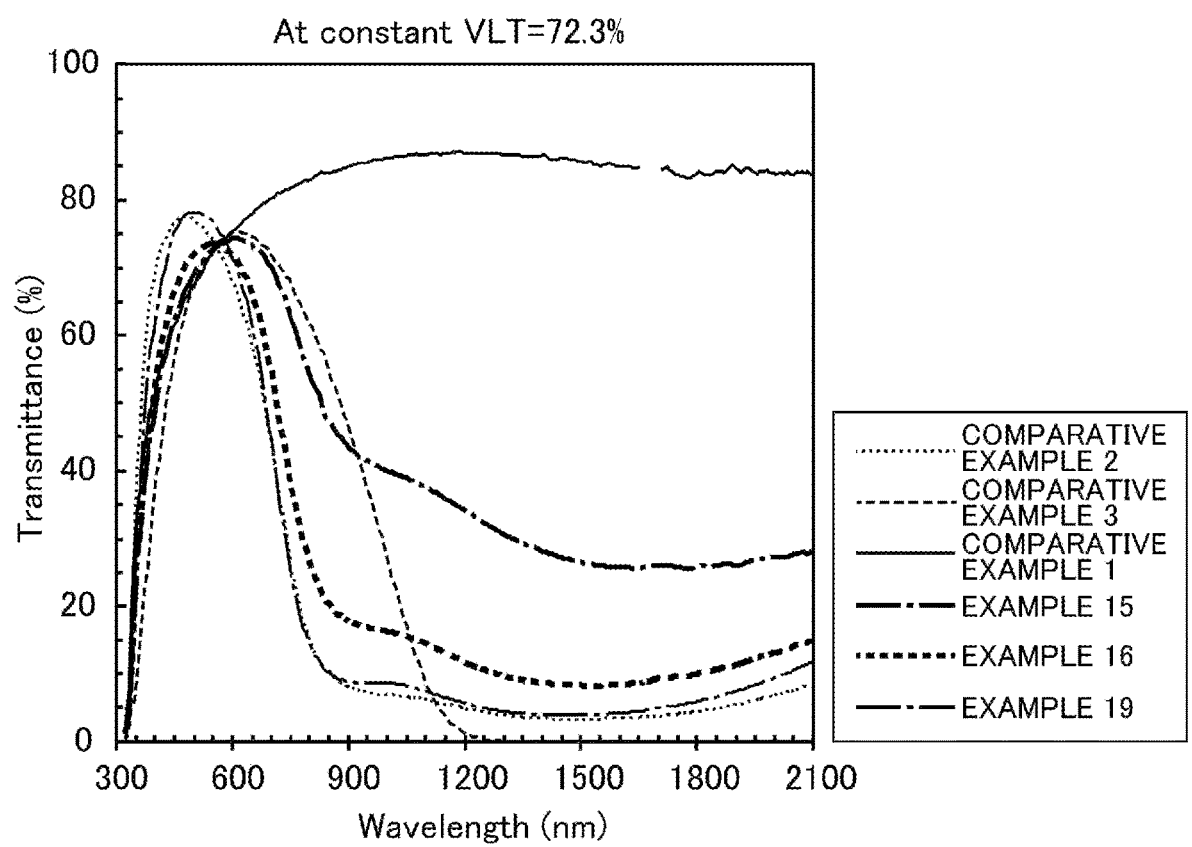
FIG. 10A shows transmittance profiles of dispersion liquids prepared in Examples 15, 16, and 19, and Comparative Examples 1 to 3, derived to make VLT constant.
Figure 10B:
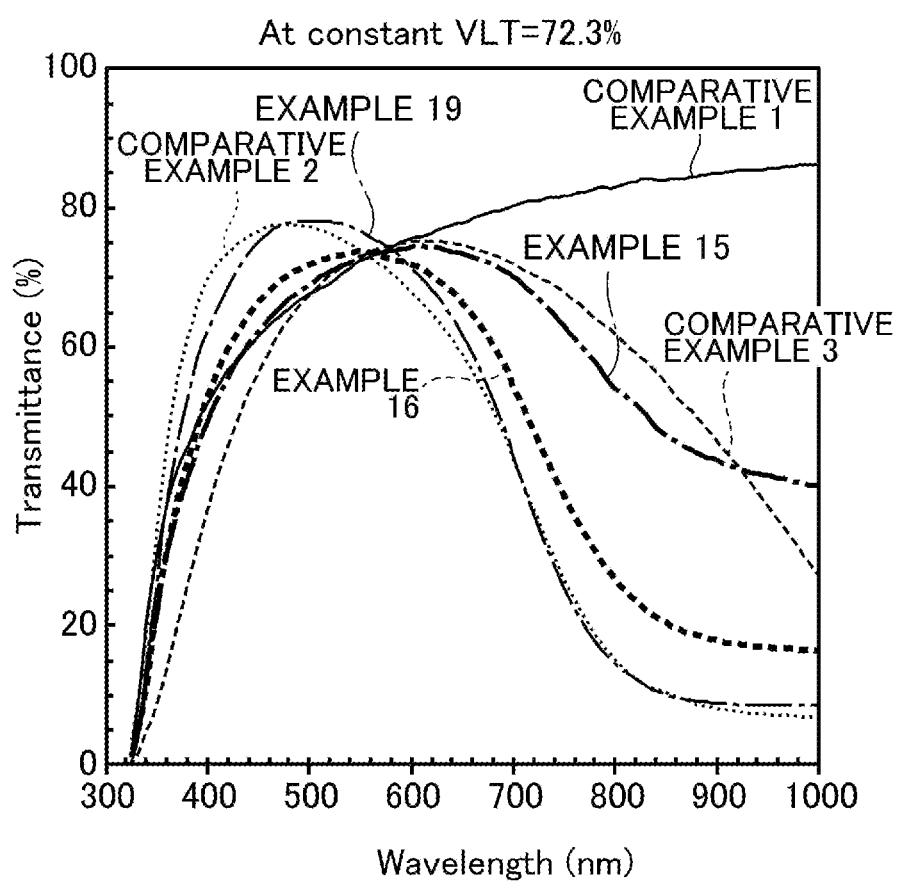
FIG. 10B shows transmittance profiles of dispersion liquids prepared in Examples 15, 16, and 19, and Comparative Examples 1 to 3, derived to make VLT constant.

Powder B prepared in Example 2 was dispersed and pulverized in the same manner as in Example 14 to obtain a dispersion liquid B. The dispersed particle diameter of the particles was 31.4 nm. The profiles of the molar absorption coefficients of the dispersion liquid B are shown in FIGS. 9A-9C. The profiles of the transmittance of the dispersion liquid B are shown in FIGS. 10A and 10B. In the derivation of the profile of the transmittance, the profile of the transmittance was derived from the molar absorption coefficient using the Lambert-Beer formula so as to obtain the VLT value that was the same as the VLT value of a spectral transmittance of the dispersion liquid A obtained in Example 14. In Comparative Examples 1 to 3, and Examples 16 and 19, described below, as shown in FIGS. 10A and 10B, the profiles were derived in the same manner as above.

Because a solar radiation shielding effect and a transmission color vary depending on the VLT value of the film, they need to be evaluated for the same value of the VLT. Therefore, an application liquid B was prepared by adjusting the mixing ratio of the dispersion liquid B, the ultraviolet curing resin, and the MIBK so as to obtain the range of the VLT value (72.0% to 73.0%) that is almost the same as the VLT value of the spectral transmittance obtained by the electromagnetic wave absorbing film in Example 14. The application liquid B was applied to a PET film, dried, and cured, in the same manner as Example 14, and an electromagnetic wave absorbing film B was prepared.

The optical characteristics of the electromagnetic wave absorbing film B were VLT=72.7% and ST=41.6%, indicating that the film has excellent solar radiation shielding characteristics.

In addition, the color indices of the electromagnetic wave absorbing film B was L*=88.5, a*=−3.9, and b*=5.4, indicating a color tone close to neutral color with the positive value of b* and weak blue color. The thin dispersion film of the electromagnetic wave absorbing particles with VLT=70-80% used for a windshield of vehicle is a film in which blueness is not felt.

Comparative Example 1

The $Cs_4W_{11}O_{35}$ powder, which was the powder A' obtained in Example 1, was pulverized and dispersed in the same manner as in Example 14, to obtain a dispersion liquid N. The color of the dispersion liquid N was grayish white, and the dispersed particle diameter of particles in the dispersion liquid N was 30.3 nm. The profiles of transmittance of the dispersion liquid N are shown in FIGS. 10A and 10B.

In the same way as the procedure performed in Example 15, the mixing ratio of the dispersion liquid N, the ultraviolet curing resin, and the MIBK was adjusted to obtain an application liquid N, and then an electromagnetic wave absorbing film N was obtained. On the other hand, as the spectral characteristics of the electromagnetic wave absorbing film N, VLT=72.6% and ST=80.2% were obtained, indicating that there is almost no infrared absorption effect.

Comparative Example 2

The raw material mixture was prepared by weighing, cesium carbonate ($Cs_2CO_3$) aqueous solution, tungstic acid ($H_2WO_4$), and tungsten dioxide ($WO_2$) powder to form a composition of $Cs_2O \cdot 5WO_3 \cdot 4WO_2$, mixing, and kneading. After sufficient mixing, the raw material mixture was spread over the carbon boat in a thin flat manner, held at 550° C. for 60 minutes in a gas stream, in which $N_2$ gas was a carrier and a $H_2$ gas of 1 vol % was mixed, and then the gas stream was changed to a 100% $N_2$ gas stream, held for 1 hour, the temperature was increased to 800° C., and held for 1 hour, and slow-cooled to the room temperature, and a powder O was obtained. The color of the powder O was deep blue. As a result of chemical analysis, a composition of $Cs_{0.33}WO_{2.74}$ was obtained.

The XRD pattern of the powder O showed a single phase of the hexagonal crystal structure. According to the Rietveld analysis, the lattice constants a=7.4088 Å and c=7.6033 Å were obtained. The value of the lattice constant in the c-axis direction was a preferable value.

Next, the TEM observation was performed, and no significant lattice defects were found. In the STEM atomic image observation, no significant lattice defects were observed and no W loss was observed.

The powder O was pulverized and dispersed in the same manner as in Example 15, to obtain a dispersion liquid O. The color of the dispersion liquid O was deep blue. The dispersed particle diameter of the electromagnetic wave absorbing particles in the dispersion liquid O was 25.8 nm. The profiles of transmittance of the dispersion liquid O are shown in FIGS. 10A and 10B.

In the same way as the procedure performed in Example 15, the mixing ratio of the dispersion liquid O, the ultraviolet curing resin, and the MIBK was adjusted to obtain an application liquid O, and then an electromagnetic wave absorbing film O was obtained.

The spectral characteristics of the electromagnetic wave absorbing film O: VLT=72.5%, and ST=37.5%, and the color indices: L*=88.2, a*=−5.7, and b*=−2.8 were obtained. Therefore, it is found that the powder and the dispersion liquid have a strong near infrared absorption effect, but in the electromagnetic wave absorbing film O containing the dispersion, blueness is clearly recognized due to the negative value of b*.

Comparative Example 3

A dispersion liquid of $In_2O_3$:Sn (hereinafter, abbreviated as ITO) having a neutral color tone was prepared as a reference sample of the color tone. ITO fine particles are known to have a neutral color tone, but there are a variety of types, ranging from slightly blue to brown, depending on the method of reduction or the method of preparation. In the present case, an ITO powder (powder P) manufactured by ENAM Optoelectronic Material Co., Ltd. was used, which was close to pure transparent color.

The powder P was pulverized and dispersed in the same manner as in Example 14, to obtain a dispersion liquid P. The color of the dispersion liquid P was light blue. The dispersed particle diameter of the electromagnetic wave absorbing particles in the dispersion liquid P was 35.4 nm. The profiles of transmittance of the dispersion liquid P are shown in FIGS. 10A and 10B.

In the same manner as the procedure performed in Example 15, the mixing ratio of the dispersion liquid P, the ultraviolet curing resin, and the MIBK was adjusted to obtain an application liquid P, and then an electromagnetic wave absorbing film P was obtained. The spectral characteristics of the electromagnetic wave absorbing film P: VLT=72.7%, and ST=47.8%, and the color indices: L*=88.3, a*=−2.2, b*=12.4 were obtained. Therefore, it is found that the electromagnetic wave absorbing film P containing the dispersion using the ITO powder and the dispersion liquid has a very low blue color due to the positive great value of b*, and is recognized with neutral color. However, it was confirmed that the near infrared absorption effect was the same as that of Example 15, and the near infrared absorption effect was inferior to that of Comparative Example 2.

Examples 16 to 20

The powder C to the powder G prepared in Example 3 to Example 7 were dispersed and pulverized in the same manner as Example 14, to obtain a dispersion liquid C to a dispersion liquid G. FIG. 9 shows a profile of the molar absorption coefficient of each dispersion liquid. TABLE 2 shows a dispersed particle diameter of each dispersion liquid.

Then, in the same manner as the procedure performed in Example 15, the mixing ratio of each dispersion liquid, the ultraviolet curing resin, and the MIBK was adjusted, and then an application liquid C to an application liquid G were obtained. An electromagnetic wave absorbing film C to an electromagnetic wave absorbing film G were obtained using the application liquids. TABLE 2 shows the optical characteristics and color indices of each electromagnetic wave absorbing film.

In these electromagnetic wave absorbing films, as the reduction time at 800° C. becomes longer, near infrared absorption increases, while a blue tendency of the transmission color becomes stronger. However, in any cases, it was confirmed that the color tone was close to the neutral color.

As described above, profiles of the transmittance of the dispersion liquids related to Comparative Examples 1 to 3, 15, 16, and 19 are summarized in FIGS. 10A and 10B. FIG. 10B is a partially enlarged view of FIG. 10A.

Figure 11A:
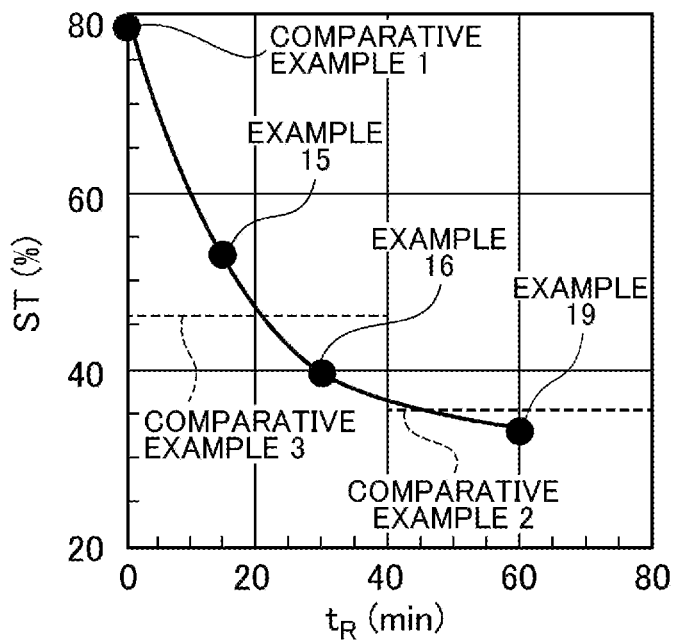
FIG. 11A is an explanatory diagram illustrating changes in near-infrared ray absorption characteristics of the dispersion liquid according to Comparative Examples 1 to 3, and Examples 15, 16, and 19, with reduction time.
Figure 11B:
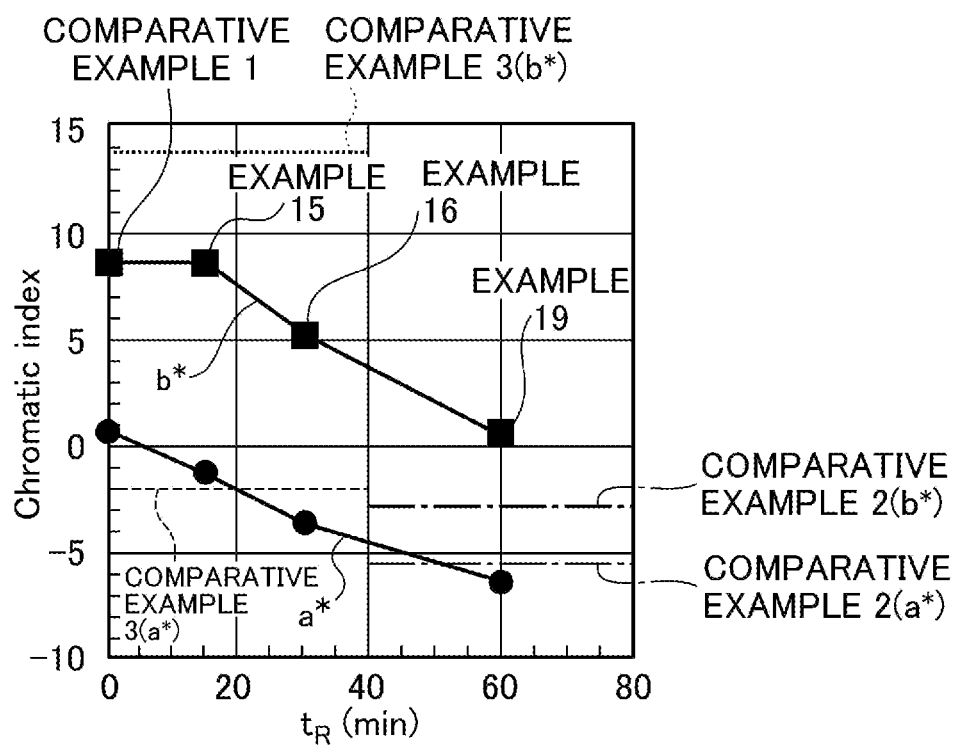
FIG. 11B is an explanatory diagram illustrating changes in color indices of the dispersion liquid according to Comparative Examples 1 to 3, and Examples 15, 16, and 19, with reduction time.
Figure 11C:
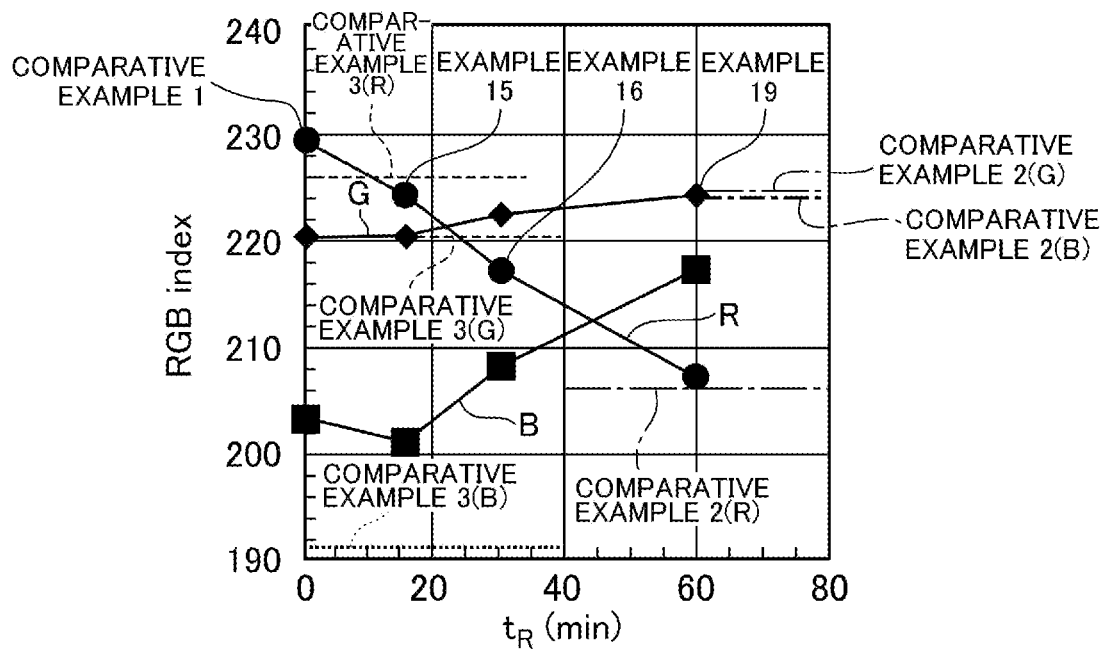
FIG. 11C is an explanatory diagram illustrating changes in color indices of the dispersion liquid according to Comparative Examples 1 to 3, and Examples 15, 16, and 19, with reduction time.

The solar radiation transmittance (ST) of the dispersion liquid according to Comparative Examples 1 to 3, 15, 16, and 19 is shown in FIG. 11A, and the color index is shown in FIGS. 11B and 11C. Note that in FIGS. 11A to 11C, $t_R$ in the horizontal axis means the reduction time at 800° C. Thus, although only part of FIGS. 11A-11C is attached with an explanation, the same examples with the same $t_R$ are the same experimental examples.

In FIGS. 10A and 10B, Comparative Example 1 has a low transmittance of the blue wavelength, but a high transmittance of the red wavelength, so that when a dispersion film (dispersion body) is formed, it appears to be a transparent film as a whole. Conversely, in Comparative Example 2, the transmittance of the blue wavelength is high, while the transmittance of the red wavelength significantly decreases, so that when a dispersion film (dispersion body) is formed, it appears to be a bluish film as a whole.

The dispersion liquids of Examples 15, 16 and 19 are intermediate between the dispersion liquids of Comparative Examples 1 and 2, and have a tendency that as the reduction time at 800° C. increases, the blue wavelength transmittance gradually increases, and conversely, the red wavelength transmittance rapidly decreases with the absorption in the near infrared region. In Example 19, in which the reduction time is 60 minutes at 800° C., the transmittance profile comes closer to Comparative Example 2. However, it can be seen that even with the same VLT values, the transmittance at the red wavelength in the electromagnetic wave absorbing film of Example 19 is to the same extent, but the transmittance at the blue wavelength is lower, so that the transmission profile has a more neutral color tone.

In FIG. 11A, it was confirmed that the dispersion liquids of Example 16 and Example 19, in which the reduction time at 800° C. exceeded 20 minutes had superior characteristics to that of the dispersion liquid of Comparative Example 3 using ITO than the solar radiation shielding effect. When the reduction time at 800° C. is 60 minutes, the characteristic is almost the same as that of the conventional dispersion liquid in Comparative Example 2 using $Cs_{0.33}WO_3$.

As for the hue shown in FIGS. 11B and 11C, it is found that the b* value is larger than the Comparative Example 2 using $Cs_{0.33}WO_3$ and is a numerical value on the neutral side, up to the reduction time at 800° C. of about 30 minutes, so that the hue is greatly improved.

Examples 21 Through 24

The powder H to the powder K prepared in Example 8 to Example 11 were dispersed and pulverized in the same manner as Example 14, to obtain a dispersion liquid H to a dispersion liquid K. TABLE 2 shows a dispersed particle diameter of each dispersion liquid. In addition, profiles of the molar absorption coefficients of the obtained dispersion liquids are shown in FIG. 9C.

Then, in the same manner as the procedure performed in Example 15, the mixing ratio of each dispersion liquid, the ultraviolet curing resin, and the MIBK was adjusted, and then an application liquid H to an application liquid K were adjusted so that the VLT of the electromagnetic wave absorbing film obtained from each dispersion liquid was from 72% to 74%, and then an electromagnetic wave absorbing film H to an electromagnetic wave absorbing film K were obtained.

The optical characteristics and the color indices of these electromagnetic wave absorbing films are shown in TABLE 2.

In these electromagnetic wave absorbing films, the reduction temperature and the time at from 650° C. to 950° C. are different, but it can be seen that the greater the high temperature reduction degree of the particles, the greater the near infrared absorption, while the stronger the blue tendency of the transmission color. However, in any cases, it was confirmed that the color tone was close to the neutral color.

It was confirmed that the blue tendency of the transmission color and the near infrared absorption effect were in the relationship of trade-off with each other, and that it was preferable to choose an appropriate high temperature reduction degree depending on the application.

Examples 25, 26

The powder L and the powder M prepared in Examples 12 and 13 were dispersed and pulverized in the same manner as in Example 14, to obtain a dispersion liquid L and a dispersion liquid M. TABLE 2 shows dispersed particle diameters of the dispersion liquids.

Then, in the same manner as the procedure performed in Example 15, the mixing ratio of each dispersion liquid, the ultraviolet curing resin, and the MIBK was adjusted, and an application liquid L and an application liquid M were adjusted so that the VLT of the electromagnetic wave absorbing film obtained from each dispersion liquid was about 72%, and then an electromagnetic wave absorbing film L and an electromagnetic wave absorbing film M were obtained.

The optical characteristics and the color indices of these electromagnetic wave absorbing films are shown in TABLE 2. In these electromagnetic wave absorbing films, the composition and structure of the raw material powder are slightly different from powder of $Cs_4W_{11}O_{35}$ containing $Cs_6W_{11}O_{36}$ or $Cs_2W_6O_{19}$. However, the change from orthorhombic crystal structure to hexagonal crystal structure due to high-temperature reduction basically includes the same content, and the characteristics of the electromagnetic wave absorbing film are considered to depend mainly on the reduction condition at high temperature.

In other words, even when the raw material powder is changed among tungsten oxides $Cs_2O \cdot nWO_3$ ($3.6 \leq n \leq 9.0$) containing Cs and W, it can be seen that the greater the high temperature reduction degree of the particles, the greater the near infrared absorption, while the stronger the blue tendency of the transmission color. The blue tendency of the transmission color and the near infrared absorption effect were in the relationship of trade-off with each other, and an appropriate high temperature reduction degree can be chosen depending on the application.

Example 27

An application liquid A was prepared by mixing the dispersion liquid C prepared in Example 16, the ultraviolet curing resin (ARONIX UV-3701 by TOAGOSEI Co., Ltd.), and the MIBK. The resulting coating liquid was applied to a soda lime glass substrate with a thickness of 3 mm by a bar coater (IMC-700 by Imoto Machinery Co., Ltd.) to form an application film. The solvent was evaporated from the application film, and then the application film was irradiated with ultraviolet light with a high-pressure mercury lamp to cure the application film to produce an electromagnetic wave absorbing transparent base material with an electromagnetic wave absorbing layer.

When the optical characteristics of the electromagnetic wave absorbing transparent base material according to Example 27 were measured in the same manner as Example 14, VLT=72.2%, ST=37.0%, L*=88.6, a*=−3.8, and b*=4.3 were obtained.

Example 28

From the dispersion liquid C prepared in Example 16 the solvent MIBK was removed using a vacuum dryer, and an electromagnetic wave absorbing particle dispersion powder C was obtained. 100 parts by weight of the polycarbonate resin pellet and 0.15 parts by weight of the dispersion powder C were uniformly mixed, then melt and kneaded at 290° C. using a twin-screw extruder (manufactured by Toyo Seiki Seisaku-sho, Ltd.), cut an extruded strand with a diameter of 3 mm, and pelletized to obtain a master batch C. When the polycarbonate resin pellet and the master batch C were molded into a polycarbonate sheet with a thickness of 2 mm, the polycarbonate resin pellet and the master batch C were blended so that the VLT was approximately 72%, and uniformly mixed to obtain a mixture. Then, the mixture was molded into a shape of sheet with a size of 10 cm×5 cm and a thickness of 2.0 mm using an injection molding machine, to prepare an electromagnetic wave absorbing particle dispersion according to Example 28. The optical characteristics of the electromagnetic wave absorbing particle dispersion according to Example 28 were measured in the same manner as in Example 14, VLT=72.4%, ST=39.1%, L*=88.3, a*=−4.4, and b*=4.6 were obtained.

Example 29

The dispersion powder C produced in Example 28 and a plasticizer, which is a compound of a monohydric alcohol and an organic acid ester, were mixed to prepare a plasticizer dispersion liquid. The plasticizer dispersion liquid and polyvinyl acetal resin were blended at a ratio so that the VLT of an electromagnetic wave absorbing laminate according to Example 29 was approximately 72%, and mixed, to form a resin composition, which was loaded into the twin screw extruder. The resin composition was kneaded at 200° C. and extruded from the T-die, and an intermediate film which was an electromagnetic wave absorbing particle dispersion having a thickness of 0.7 mm was obtained by using the calendar roll method. The obtained intermediate film was sandwiched between two soda lime glass substrates to produce the electromagnetic wave absorbing laminate according to Example 29. The optical characteristics of the electromagnetic wave absorbing laminate according to Example 29 were measured in the same manner as Example 14, and VLT=72.3%, ST=36.7%, L*=88.7, a*=−4.2, and b*=4.1 were obtained.

TABLE 1

| | | Starting material (molar ratio) | | | | Heating reduction process | | Chemical analysis composition (at %) | | | Composition ratios when W is 1 | | | X-ray diffraction measurement results | |
|---|---|---|---|---|---|---|---|---|---|---|---|---|---|---|---|
| | Powder | Cs | W | O | | Temp. (° C.) | Time (min) | Cs | W | O | Cs | W | O | pattern | c-axis (Å)(H) |
| Ex. 1 | A | 4 | 11 | 35 | | 800 | 5 | 9.18 | 23.4 | 67.4 | 0.4 | 1.0 | 2.9 | R + H | 7.5752 |
| Ex. 2 | B | 4 | 11 | 35 | | 800 | 15 | 9.16 | 24.6 | 66.2 | 0.4 | 1.0 | 2.7 | R + H | 7.5940 |

TABLE 1-continued

| | Powder | Starting material (molar ratio) Cs | W | O | Heating reduction process Temp. (° C.) | Time (min) | Chemical analysis composition (at %) Cs | W | O | Composition ratios when W is 1 Cs | W | O | X-ray diffraction measurement results pattern | c-axis (Å)(H) |
|---|---|---|---|---|---|---|---|---|---|---|---|---|---|---|
| Ex. 3 | C | 4 | 11 | 35 | 800 | 30 | 9.27 | 25.0 | 65.8 | 0.4 | 1.0 | 2.6 | R + H | 7.6107 |
| Ex. 4 | D | 4 | 11 | 35 | 800 | 35 | 9.25 | 24.9 | 65.9 | 0.4 | 1.0 | 2.6 | R + H | 7.6121 |
| Ex. 5 | E | 4 | 11 | 35 | 800 | 40 | 9.29 | 24.9 | 65.8 | 0.4 | 1.0 | 2.6 | H | 7.6118 |
| Ex. 6 | F | 4 | 11 | 35 | 800 | 60 | 9.30 | 25.3 | 65.4 | 0.4 | 1.0 | 2.6 | H | 7.6121 |
| Ex. 7 | G | 4 | 11 | 35 | 800 | 90 | 9.27 | 25.0 | 65.8 | 0.4 | 1.0 | 2.6 | H | 7.6119 |
| Ex. 8 | H | 4 | 11 | 35 | 650 | 120 | 9.17 | 23.6 | 67.2 | 0.4 | 1.0 | 2.8 | R + H | 7.5765 |
| Ex. 9 | I | 4 | 11 | 35 | 700 | 60 | 9.19 | 24.2 | 66.6 | 0.4 | 1.0 | 2.8 | R + H | 7.5829 |
| Ex. 10 | J | 4 | 11 | 35 | 900 | 10 | 9.26 | 25.0 | 65.7 | 0.4 | 1.0 | 2.6 | H | 7.5917 |
| Ex. 11 | K | 4 | 11 | 35 | 950 | 20 | 9.28 | 25.2 | 65.5 | 0.4 | 1.0 | 2.6 | H | 7.6115 |
| Ex. 12 | L | 6 | 11 | 36 | 800 | 30 | 10.30 | 23.9 | 65.8 | 0.4 | 1.0 | 2.8 | R + H | 7.6027 |
| Ex. 13 | M | 2 | 6 | 19 | 800 | 30 | 8.97 | 25.4 | 65.6 | 0.4 | 1.0 | 2.6 | R + H | 7.6081 |

TABLE 2

| | Dispersion liquid | Dispersed diameter (nm) particle | Optical characteristics of electromagnetic wave absorbing transparent base material VLT (%) | ST (%) | L* | a* | b* |
|---|---|---|---|---|---|---|---|
| Ex. 14 | A | 26.4 | 72.3 | 55.3 | 88.4 | −1.4 | 8.8 |
| Ex. 15 | B | 31.4 | 72.7 | 41.6 | 88.5 | −3.9 | 5.4 |
| Ex. 16 | C | 29.3 | 72.3 | 39.6 | 88.6 | −4.4 | 4.6 |
| Ex. 17 | D | 25.7 | 72.9 | 38.8 | 88.6 | −4.7 | 3.5 |
| Ex. 18 | E | 31.1 | 72.3 | 35.8 | 88.7 | −6.7 | 0.8 |
| Ex. 19 | F | 23.4 | 72.6 | 36.2 | 88.7 | −6.4 | 1.1 |
| Ex. 20 | G | 24.5 | 72.3 | 36.5 | 88.7 | −6.6 | 0.9 |
| Ex. 21 | H | 28.6 | 72.1 | 61.3 | 88.5 | −1.1 | 8.9 |
| Ex. 22 | I | 29.8 | 72.0 | 58.4 | 88.5 | −1.2 | 9.4 |
| Ex. 23 | J | 30.1 | 73.1 | 38.0 | 88.9 | −5.3 | 2.9 |
| Ex. 24 | K | 26.2 | 72.5 | 36.1 | 88.8 | −6.7 | 1.1 |
| Ex. 25 | L | 34.6 | 72.8 | 42.1 | 88.6 | −3.9 | 5.2 |
| Ex. 26 | M | 31.7 | 72.4 | 40.9 | 88.5 | −4.1 | 4.7 |
| Comp. ex. 1 | N | 30.3 | 72.6 | 80.2 | 88.4 | 0.4 | 9.3 |
| Comp. ex. 2 | O | 25.8 | 72.5 | 37.5 | 88.2 | −5.7 | −2.8 |
| Comp. ex. 3 | P | 35.4 | 72.7 | 47.8 | 88.3 | −2.2 | 12.4 |
| Ex. 27 | C | 29.3 | 72.2 | 37.0 | 88.6 | −3.8 | 4.3 |
| Ex. 28 | C | 29.3 | 72.4 | 39.1 | 88.3 | −4.4 | 4.6 |
| Ex. 29 | C | 29.3 | 72.3 | 36.7 | 88.7 | −4.2 | 4.1 |

As described above, the electromagnetic wave absorbing particle dispersion, the electromagnetic wave absorbing laminate, and the electromagnetic wave absorbing transparent base material have been explained in the embodiments, Examples, and the like. However, the present invention is not limited to the above-described embodiments, Examples, and the like. Various modifications and variations are possible within the scope of the summary of the present invention as recited in the claims.

The present application claims priority to Japanese patent application No. 2020-015746 filed Jan. 31, 2020, the entire contents of which are hereby incorporated by reference.

The invention claimed is:

1. An electromagnetic wave absorbing particle dispersion comprising:
electromagnetic wave absorbing particles containing cesium tungsten oxide represented by a general formula $Cs_xW_{1-y}O_{3-z}$ and having an orthorhombic crystal structure or a hexagonal crystal structure, x, y and z being $0.2 \leq x \leq 0.4$, $0 < y \leq 0.4$, and $0 < z \leq 0.46$; and
a solid medium, wherein
the electromagnetic wave absorbing particles are dispersed in the solid medium.

2. The electromagnetic wave absorbing particle dispersion according to claim 1, wherein
the cesium tungsten oxide has a linear defect or a planar defect on one or more planes selected from a (010) plane of an orthorhombic crystal structure, a {100} plane that is a prism plane of a hexagonal crystal structure, and a (001) plane that is a bottom plane of a hexagonal crystal structure.

3. The electromagnetic wave absorbing particle dispersion according to claim 1, wherein
the cesium tungsten oxide has a defect, and
the defect includes tungsten loss.

4. The electromagnetic wave absorbing particle dispersion according to claim 1, wherein
a part of O of a W—O octahedron constituting the orthorhombic crystal structure or the hexagonal crystal structure of the cesium tungsten oxide is randomly lost.

5. The electromagnetic wave absorbing particle dispersion according to claim 1, wherein
a c-axis length in terms of a hexagonal crystal structure of the cesium tungsten oxide is 7.560 Å to 7.750 Å inclusive.

6. The electromagnetic wave absorbing particle dispersion according to claim 1, wherein
a part of Cs of the cesium tungsten oxide is replaced by an additive element, the additive element being one or more types selected from Na, Tl, In, Li, Be, Mg, Ca, Sr, Ba, Al, and Ga.

7. The electromagnetic wave absorbing particle dispersion according to claim 1, wherein
an average particle diameter of the electromagnetic wave absorbing particles is 0.1 nm to 200 nm inclusive.

8. The electromagnetic wave absorbing particle dispersion according to claim 1, wherein
a surface of the electromagnetic wave absorbing particle is modified with a compound including elements of one or more types selected from Si, Ti, Zr, and Al.

9. The electromagnetic wave absorbing particle dispersion according to claim 1, wherein
particles obtained by heating and reducing a crystalline powder of a cesium tungsten oxide precursor $nCs_2O \cdot mWO_3$ in an atmosphere of a reducing gas at a temperature of 650° C. to 950° C. inclusive are used as the electromagnetic wave absorbing particles, n and m being integers and a ratio m/n being 3.6≤m/n≤9.0.

10. The electromagnetic wave absorbing particle dispersion according to claim 1, wherein
particles obtained by heating and reducing a cesium tungsten oxide precursor containing a $Cs_4W_{11}O_{35}$ phase as a main phase in an atmosphere of a reducing gas at a temperature of 650° C. to 950° C. inclusive as the electromagnetic wave absorbing particles.

11. The electromagnetic wave absorbing particle dispersion according to claim 1, wherein
the solid medium is a resin.

12. The electromagnetic wave absorbing particle dispersion according to claim 11, wherein
the resin is one type of resin selected from the resin group consisting of polyester resin, polycarbonate resin, acrylic resin, styrene resin, polyamide resin, polyethylene resin, vinyl chloride resin, olefin resin, epoxy resin, polyimide resin, fluorine resin, ethylene-vinyl acetate copolymer, polyvinyl acetal resin, and ultraviolet curing resin; or is a mixture of two or more types of resins selected from the resin group.

13. The electromagnetic wave absorbing particle dispersion according to claim 1, wherein
the electromagnetic wave absorption particle dispersion has a sheet shape, a board shape, or a film shape.

14. An electromagnetic wave absorbing laminate comprising:
a laminated structure including
the electromagnetic wave absorbing particle dispersion according to claim 1, and
a transparent base material.

15. An electromagnetic wave absorbing transparent base material comprising:
a transparent base material; and
an electromagnetic wave absorbing layer provided on at least one surface of the transparent base material, wherein
the electromagnetic wave absorbing layer is the electromagnetic wave absorbing particle dispersion according to claim 1.

* * * * *